United States Patent

Nakayama et al.

[11] Patent Number: 5,945,927
[45] Date of Patent: *Aug. 31, 1999

[54] APPARATUS AND METHOD FOR NAVIGATING VEHICLE TO DESTINATION USING DISPLAY UNIT

[75] Inventors: Okihiko Nakayama; Norimasa Kishi; Masaki Watanabe, all of Yokohama; Kiyomichi Yamada, Ebina, all of Japan; Hiroshi Tsuda, Novi, Mich.

[73] Assignee: Nissan Motor Co., Ltd., Kanagawa-ken, Japan

[*] Notice: This patent is subject to a terminal disclaimer.

[21] Appl. No.: 08/998,843

[22] Filed: Dec. 29, 1997

Related U.S. Application Data

[63] Continuation of application No. 08/362,647, Dec. 23, 1994, Pat. No. 5,748,109.

[30] Foreign Application Priority Data

Dec. 27, 1993 [JP] Japan ................................. 5-333496
Dec. 27, 1993 [JP] Japan ................................. 5-333497
Dec. 27, 1993 [JP] Japan ................................. 5-333498
Mar. 16, 1994 [JP] Japan ................................. 6-45809

[51] Int. Cl.⁶ ................................................. G08G 1/123
[52] U.S. Cl. ........................... 340/995; 340/990; 340/974; 701/200; 701/208; 701/210; 701/212; 701/220
[58] Field of Search ........................ 340/995, 990, 340/974, 988; 701/200, 212, 210, 208, 220; 73/178 R; 33/356; 342/457; 345/457, 113, 132, 426, 435, 502, 508, 516

[56] References Cited

U.S. PATENT DOCUMENTS

| | | | |
|---|---|---|---|
| 4,442,609 | 4/1984 | Senoo | 33/356 |
| 4,743,913 | 5/1988 | Takai | 342/457 |
| 4,757,455 | 7/1988 | Tsunoda et al. | 701/208 |
| 4,774,671 | 9/1988 | Itoh et al. | 701/208 |
| 4,774,672 | 9/1988 | Tsunoda et al. | 701/208 |
| 4,782,447 | 11/1988 | Ueno et al. | 701/208 |
| 4,812,980 | 3/1989 | Yamada et al. | 701/200 |
| 4,899,285 | 2/1990 | Nakayama et al. | 701/220 |
| 4,964,052 | 10/1990 | Ohe | 340/995 |
| 5,031,104 | 7/1991 | Ikeda et al. | 340/995 |
| 5,115,398 | 5/1992 | De Jong | 340/995 |
| 5,121,326 | 6/1992 | Moroto et al. | 701/212 |
| 5,161,886 | 11/1992 | De Jong et al. | 340/995 |
| 5,212,643 | 5/1993 | Yoshida | 340/995 |
| 5,272,638 | 12/1993 | Martin et al. | 340/990 |
| 5,371,678 | 12/1994 | Nomura | 701/210 |
| 5,377,102 | 12/1994 | Nishiishigaki | 340/990 |
| 5,420,582 | 5/1995 | Kubbat et al. | 340/974 |
| 5,566,073 | 10/1996 | Margolin | 340/995 |
| 5,748,109 | 5/1998 | Kosaka et al. | 340/995 |

FOREIGN PATENT DOCUMENTS

| | | |
|---|---|---|
| 0059435 | 1/1990 | European Pat. Off. . |
| 0378271 | 1/1990 | European Pat. Off. . |
| 4121095 | 6/1991 | Germany . |
| 57-206815 | 4/1984 | Japan . |
| 62-86499 | 4/1987 | Japan . |
| 3225391 | 10/1991 | Japan . |
| 5-221272 | 8/1993 | Japan . |
| WO86/02764 | 5/1986 | WIPO . |

Primary Examiner—Benjamin C. Lee
Attorney, Agent, or Firm—McDermott, Will & Emery

[57] ABSTRACT

A bird's eye view commonly used in a flight simulation is applicable to an apparatus and method for navigating a vehicle running on a set route of travel to a set destination using a (color) display unit according to the present invention. The bird's eye view of a road map surrounding a present position of the vehicle has a viewing point placed at a predetermined position on an upper sky in a direction opposite to the set destination with the present position of the vehicle as a reference and has a line of sight looking down over the road map so that a part of the road map surrounding the present position of the vehicle can be viewed in an extended scale form and the remaining part of the road map remote from the present position and nearer to the set destination can be viewed in a gradually reduction scale form.

11 Claims, 26 Drawing Sheets

APPARATUS AND METHOD FOR NAVIGATING VEHICLE TO DESTINATION USING DISPLAY UNIT

This application is a continuation of application Ser. No. 08/362,647 filed Dec. 23, 1994, now U.S. Pat. No. 5,748,109, which is incorporated by reference herein in its entirety.

BACKGROUND OF THE INVENTION

1. Field of the Invention

The present invention relates to an apparatus and method for navigating a vehicle to a destination to which a vehicle occupant desires to reach using a display unit.

2. Description of Background Art

Various types of vehicular navigating systems (also called, vehicular route guidance apparatuses) in which an optimum route of travel from a start point of the vehicle to a destination is searched and derived and both of the optimum route and a present position of the vehicle are displayed on a display screen of a display unit have been proposed.

FIG. 1A exemplifies a displayed image in a case of one of the previously proposed vehicular navigating systems.

As shown in FIG. 1A, the present position of the vehicle is superimposed and displayed on the display image screen with an arrow mark and with its surrounding portion of the arrow marked present position encircled by a dotted line. Then, when an operator operates a predetermined switch, a range encircled with the dotted line is displayed in an extended form as shown in FIG. 1B. This permits the operator to recognize a road (traffic) situation surrounding the present position in details. In this way, when the displayed images are exchanged from FIG. 1A to FIG. 1B and vice versa, it is always necessary to operate the predetermined switch. This makes the operation troublesome.

On the other hand, another previously proposed navigating system in which road maps having different reduction of scales are simultaneously displayed on the display image screen, this display form being, so-called, superimposed displayed patterns, as shown in FIG. 2.

FIG. 2 exemplifies the displayed image screen of the other previously proposed vehicular navigating system, with intersection situations surrounding the present position of the vehicle being displayed in the extended scale form on a right upper corner of the displayed image screen. This other previously proposed navigating system permits the vehicular occupant to recognize the road map having a wide range of view with the present position of the vehicle as a center and to recognize the road (traffic) situation surrounding the present position of the vehicle in details.

However, since, in the displayed image screen shown in FIG. 2, the part of the road map has been displayed on the right upper corner of the displayed image screen in the extended scale form, the actual road map to be displayed on the right upper corner of the displayed image screen cannot be viewed from the displayed image screen (is hidden by the extended part of the road map). Hence, in a case where, for example, the vehicle driver tries to turn a right corner corresponding to the displayed portion of the hidden part (not displayed), the vehicle driver cannot recognize a road (traffic) situation in the forward direction. This makes the vehicle driver inconvenient.

SUMMARY OF THE INVENTION

It is, therefore, a principal object of the present invention to provide an apparatus and method for navigating a vehicle with a display unit which can solve the above-described problems by coordinate system transforming a road map image data into a desired bird's eye view so that the switch to change a reduction scale percentage of the road map as shown in FIGS. 1A and 1B is not needed and no such a limitation of the displayed range as shown in FIG. 2 occurs.

According to one aspect of the present invention there is provided an apparatus for navigating a vehicle using a display unit, comprising: a) road map storing means for storing a road map data related to a road map; b) vehicle position detecting means for detecting a present position of the vehicle; c) vehicle destination setting means through which a destination to which the vehicle is desired to reach is set on the road map; d) start point setting means for setting a start point of location on the road map at which the vehicle is to start on the basis of the detected present position of the vehicle; e) route of travel setting means for setting a route of travel on the road map from the start point to the set destination; and f) display control means for controlling an image of the road map surrounding the set route of travel to be displayed on a display image screen of the display unit, the image of the road map surrounding the set route of travel to be displayed on the display unit being taken in a form of a desired bird's eye view achieved when the bird's eye as a viewing point is placed at a predetermined position on an upper sky located in a direction opposite to the set destination with the present position of the vehicle as a reference and the road map surrounding the set route of travel being looked down over from the bird's eye.

According to another aspect of the present invention there is provided a method for navigating a vehicle using a display unit, comprising the steps of: a) storing a road map data related to a road map in a predetermined storing means; b) detecting a present position of the vehicle; c) setting a destination to which the vehicle is desired to reach is set on the road map; d) setting a start point of location on the road map at which the vehicle is to start on the basis of the detected present position of the vehicle; e) setting a route of travel on the road map from the start point to the set destination; and f) displaying on a display image screen of the display unit the image of the road map surrounding the set route of travel; and g) operatively transforming a coordinate system of the road map surrounding the set route of travel into a desired bird's eye view achieved when the bird's eye as a viewing point is placed on an upper sky located in a direction opposite to the set destination with the present position of the vehicle as a reference and the road map surrounding the set route of travel being looked down over from the bird's eye.

BEST MODE CARRYING OUT THE INVENTION

Reference will hereinafter be made to the drawings in order to facilitate a better understanding of the present invention.

Before explaining first, second, third, fourth, fifth, sixth, and seventh preferred embodiments of an apparatus and method for navigating a vehicle with a display unit according to the present invention, a basic concept of the invention will be described with reference to FIGS. 3A, 3B and 4.

Figure 1A:
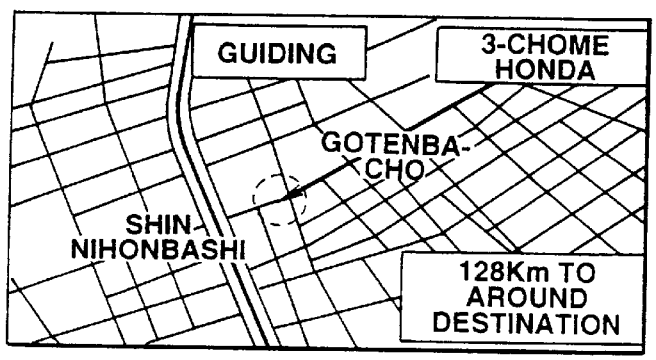
FIGS. 1A and 1B are explanatory views of examples of road map on a display image screen of a display unit in a former previously proposed navigation system described in the BACKGROUND OF THE INVENTION.
Figure 1B:
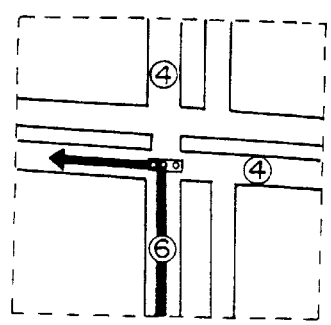
Figure 2:
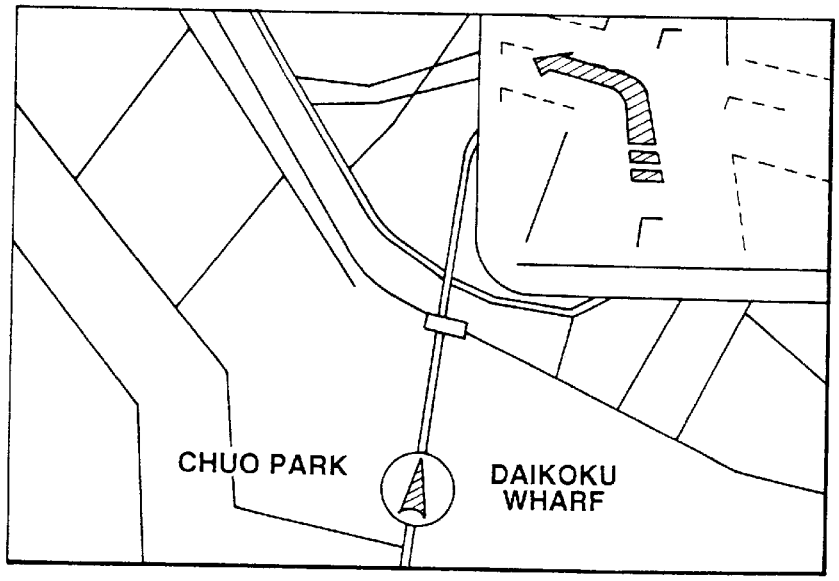
FIG. 2 is an explanatory view of another example of road maps simultaneously displayed on the display image screen of the display unit in a latter previously proposed navigation system described in the BACKGROUND OF THE INVENTION.
Figure 3A:
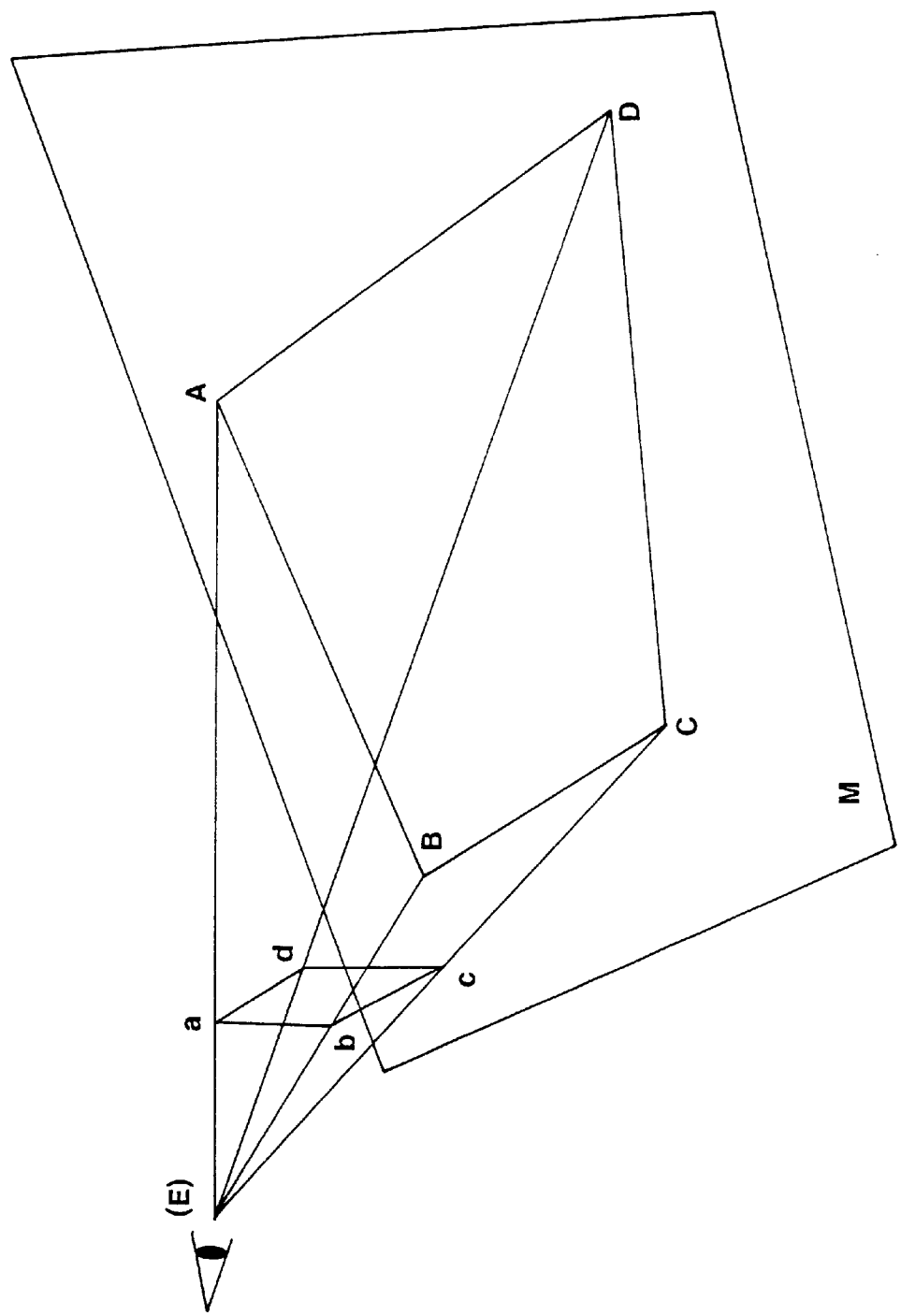
FIG. 3A is a schematic explanatory view of a bird's eye view prepared from a viewing point for explaining the bird's eye view applicable to an apparatus and method for navigating a vehicle using a display unit according to the present invention.
Figure 3:
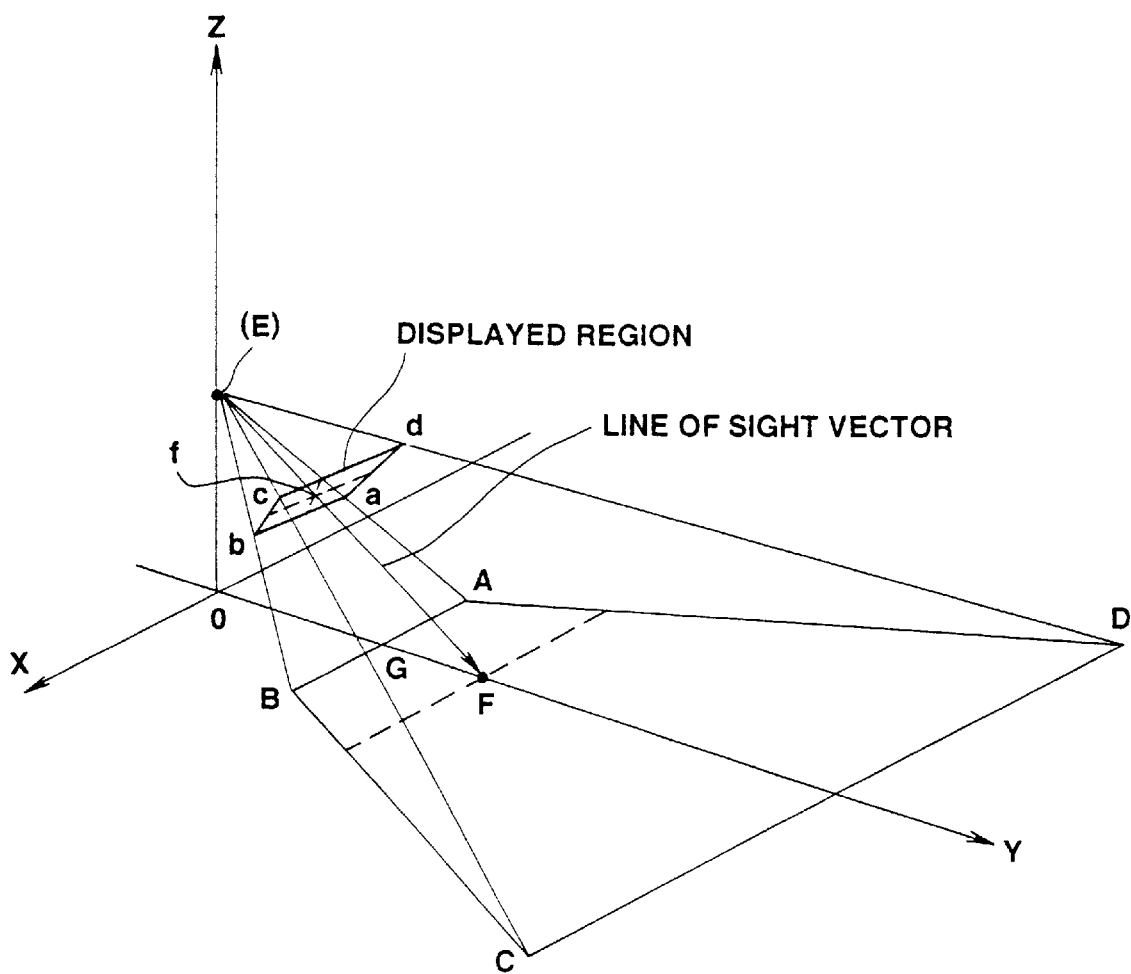
FIG. 3B is a schematic explanatory view of a bird's eye view in a three-dimensional coordinate system with a viewing point on a Z axis.

FIG. 3A and 3B show explanatory views for explaining a bird's eye view (E) from a predetermined position on an upper sky looking down to a road map as a viewing point to which the present invention is applicable.

The bird's eye view display is carried out as if the road map were viewed from an upper sky looking down thereof and is widely used in, for example, a flight simulation.

In FIG. 3A, a plane M denotes a road map and a rectangular shape a, b, c, and d denotes a displayed range through a display unit 5. Suppose that, in FIGS. 3A and 3B, a viewing point (E) is set on a position as shown in FIGS. 3A and 3B. The range of road map which can be viewed through the rectangular shape a, b, c, and d corresponds to a trapezoid region A, B, C, and D shown in FIGS. 3A and 3B. That is to say, from the position of the viewing point, a map data whose range is considerably wider than that of the rectangular shape a, b, c, and d can be viewed. In this way, the bird'eye view is displayed on the display image screen of the display unit 5 as if the shown trapezoid region A, B, C, and D were seen on its image from the position of the viewing point E of FIGS. 3A and 3B.

Figure 4:
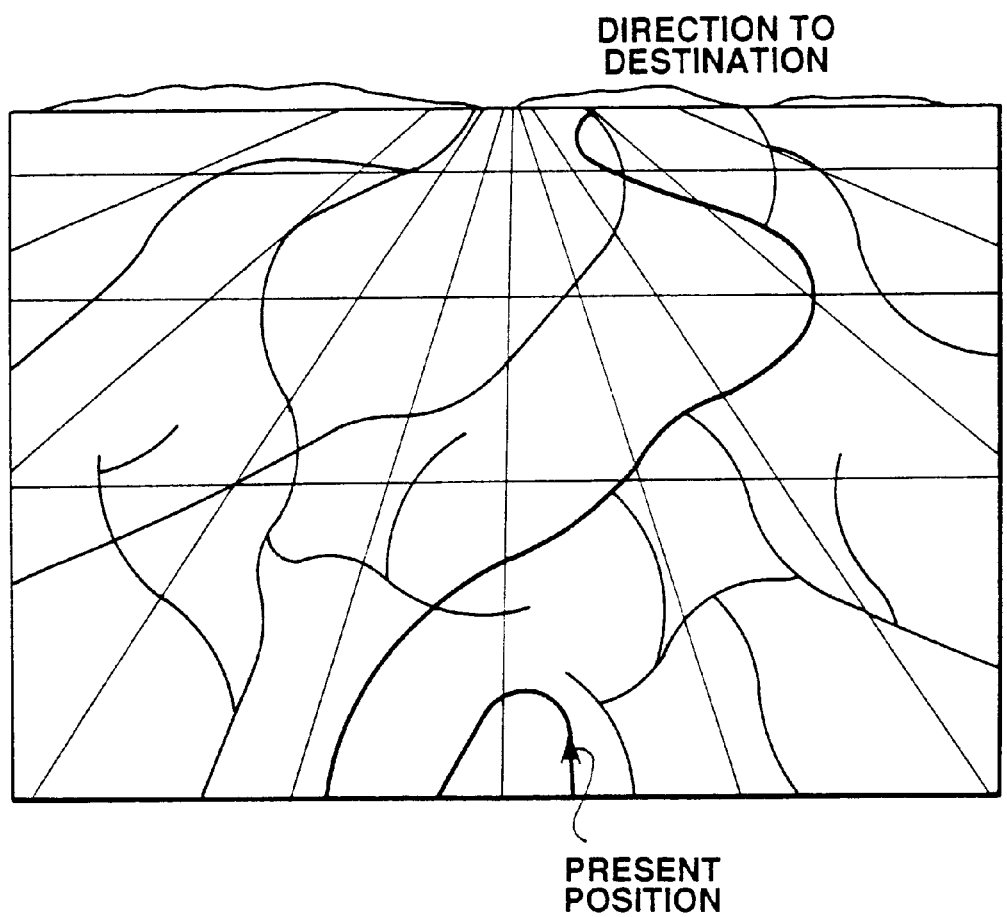
FIG. 4 is an explanatory view of an example of a displayed image screen in which the present position of the vehicle, a set optimum route of travel to a destination are displayed with the bird's eye view shown in FIG. 3.

FIG. 4 shows an example of the display of the bird's eye view on the road map surrounding an optimally set route of travel from the present position of the vehicle to the destination (a position of the road map to which the vehicle is finally to reach).

As shown in FIG. 4, the viewing point (E) is placed at the predetermined position of the upper sky in a direction opposite to the set destination and from the viewing point (E) thus placed, a destination direction is looked down through its line of sight. When the viewing point is placed at such a position as described above, an image such that a reduction scale percentage of the road map is continuously increased as the eye is approached nearly from the destination to the present position of the vehicle can be displayed as shown in FIG. 4. That is to say, the optimally set route of travel can be displayed up to the place nearer to the destination together with the surrounding position of the present position displayed in the extended scale form.

First Embodiment

Figure 5:
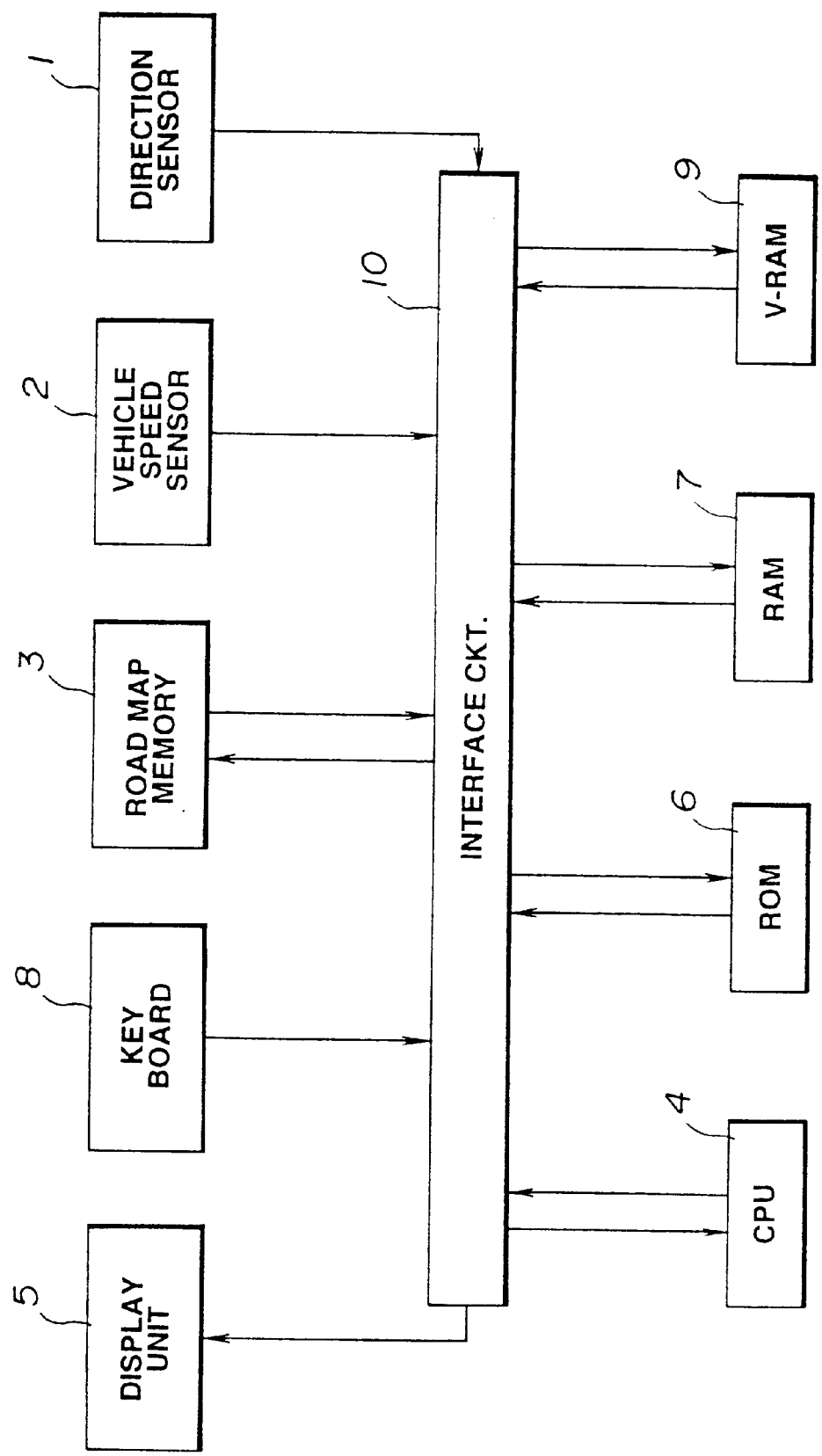
FIG. 5 is a schematic circuit block diagram of the apparatus for navigating the vehicle using the display unit in a first preferred embodiment according to the present invention.

FIG. 5 shows a schematic circuit block diagram of an apparatus for navigating a vehicle using a display unit 5 in a first embodiment according to the present invention.

In FIG. 5, a direction sensor 1 is connected to an interface circuit 10 and is arranged for, for example, detecting a geomagnetism at a position at which the vehicle is present on the basis of the North direction so as to determine a forward direction of the vehicle. The direction sensor 1 is exemplified by a U.S. Pat. No. 4,442,609 issued on Apr. 17, 1984, (the disclosure of which is herein incorporated by reference).

A vehicle speed sensor 2 is connected to the interface circuit 10. The vehicle speed sensor 2 is disposed on a power transmission output shaft and outputs a pulse train signal whose predetermined pulse number is varied depending on a vehicle speed. A map storing memory 3 serves to store a road map data including an intersection network data, the road map data further including positional information indicating nodes representing the intersections, curved road points, and so forth, route path lengths of roads connecting between the roads, and character data including name of places.

A CPU (Central Processing Unit) 4 is connected to the interface circuit 10 for preparing the bird's eye view display data on the road map according to a series of processing shown in FIGS. 6 and 7 which will be described later.

Figure 6:
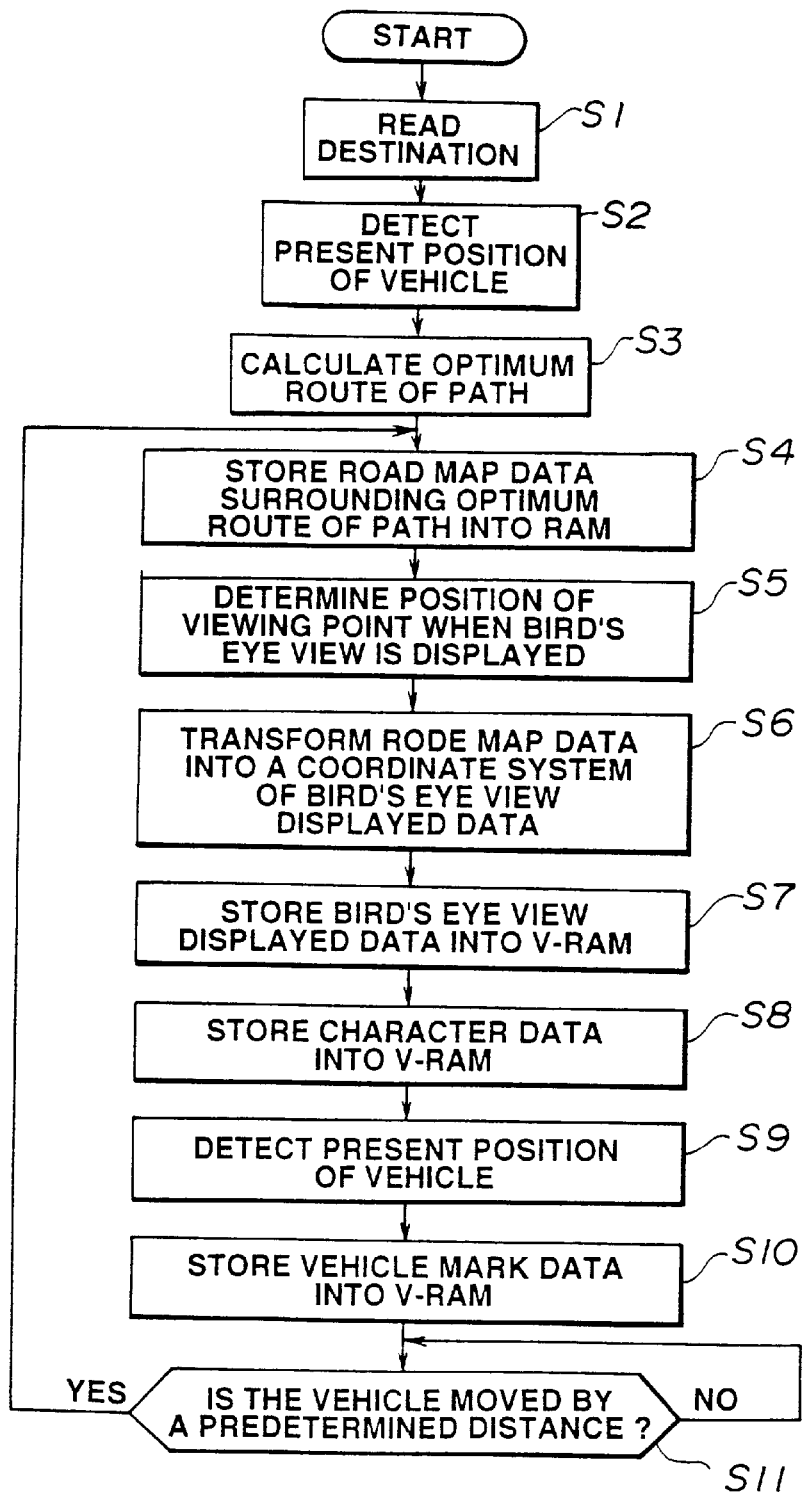
FIG. 6 is an operational flowchart for explaining an operation of the navigating apparatus shown in FIG. 5.
Figure 7:
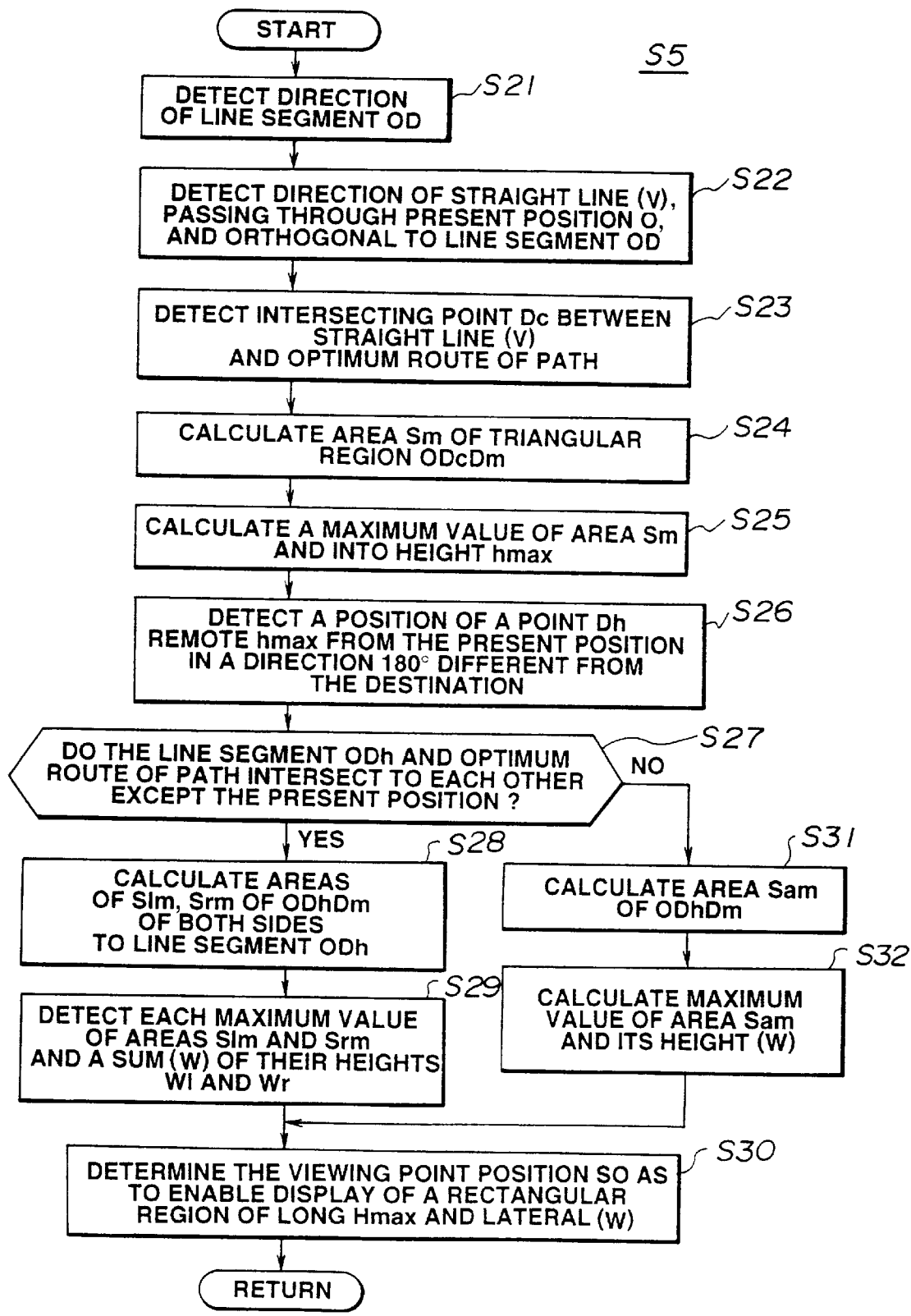
FIG. 7 is an operational flowchart for explaining a subroutine of a step S5 in FIG. 6.

A ROM (Read Only Memory) 6 is connected to the interface circuit 10 and used for storing control program, for example, shown in FIGS. 6 and 7, to be executed by the CPU 4.

A RAM (Random Access Memory) 7 is connected to the interface circuit 10 and used for storing a series of calculation results executed by the CPU 4.

A V-RAM (Video RAM) 9 is connected to the interface circuit 10 and used for storing the bird's eye view display data prepared by the CPU 4, the viewing point of and line of sight of the bird's eye view to be displayed on the display unit 5 being changed according to the content of the V-RAM 9.

An operator keyboard 8 is connected to the interface circuit 10. The interface circuit 10 is connected to every computer peripheral circuit element described above.

It is noted that as soon as an operator (vehicle driver or occupant) operates an ignition key inserted into an ignition key switch of the vehicle to turn on either of ACC, IGN, or START portion of the ignition key switch of the vehicle, the CPU 4 starts the control routine shown in FIG. 6.

An operation of the first embodiment will hereinafter be described with reference to FIGS. 6 and 7.

At a step S1 of FIG. 6, the CPU 4 reads the destination at which the vehicle is finally to reach and which is input through the keyboard 8.

At a step S2 of FIG. 6, the CPU 4 measures the number of pulses per time output from the vehicle speed sensor 2 or a pulse period of the pulse train of the vehicle speed sensor 2 so as to determine the running speed of the vehicle and measures the number of pulses so as to determine the running distance for which the vehicle has run. Next, the CPU S2 calculates a running trajectory on the basis of the forward direction of the vehicle detected by means of the direction sensor 1 and of the vehicle running distance and specifies the present position of the vehicle by means of a map matching technique between the running trajectory and road map data stored in the road map memory 3.

At a step S3, the CPU 4 calculates an optimum route of travel of the vehicle from a start point of the vehicle which is specified at the step S2 to the destination by means of a well known Dikustra technique by searching for the route of paths from the start point to the destination. This Dikustra technique is exemplified by a Japanese Patent First Publication (Unexamined) No. Showa 62-86499 published on Apr. 20, 1987 (or by U.S. Pat. No. 5,557,522 the disclosure of which is herein incorporated by reference.)

At a step S4, the road map data surrounding the searched optimally set route of travel is read from the road map data memory 3 on the basis of the calculated optimum route of travel by the CPU 4 and is stored in the RAM 7.

At a step S5, the CPU 4 determines a position of the viewing point to display the bird's eye view by means of the series of processing shown in FIG. 7. When the step S5 is processed, the road map range to be displayed on the display unit 5 is determined.

At a step S6, the CPU 4 transforms the road map data into the bird's eye view data.

That is to say, as shown in FIG. 3A, the CPU 4 transforms the road map data within the trapezoid region A, B, C, and D into the bird's eye view data to be displayed on the display unit 5 according to the positional relationship between the position of the viewing point E, the position of the rectangular shape of a, b, c, and d, and road map position.

The coordinate system transformation is such that the part of the road map corresponding to a side BC is displayed on a lower side of the display unit 5, a part of the road map corresponding to a side AD is displayed on an upper side of the display unit 5, and, in addition, the reduction scale percentage is increased as the part of the image corresponding to the side AD becomes nearer to that corresponding to the side BC.

It is noted that, the horizontal distance of the position of the viewing point E with respect to the place M and its height in the Z axis direction are defined so that, the sides BC and AB give 300 m and 10 Km in their actual dimensions, respectively, and a distance from the side CD to the side AD gives 10 Km in its actual dimension.

Figure 8:
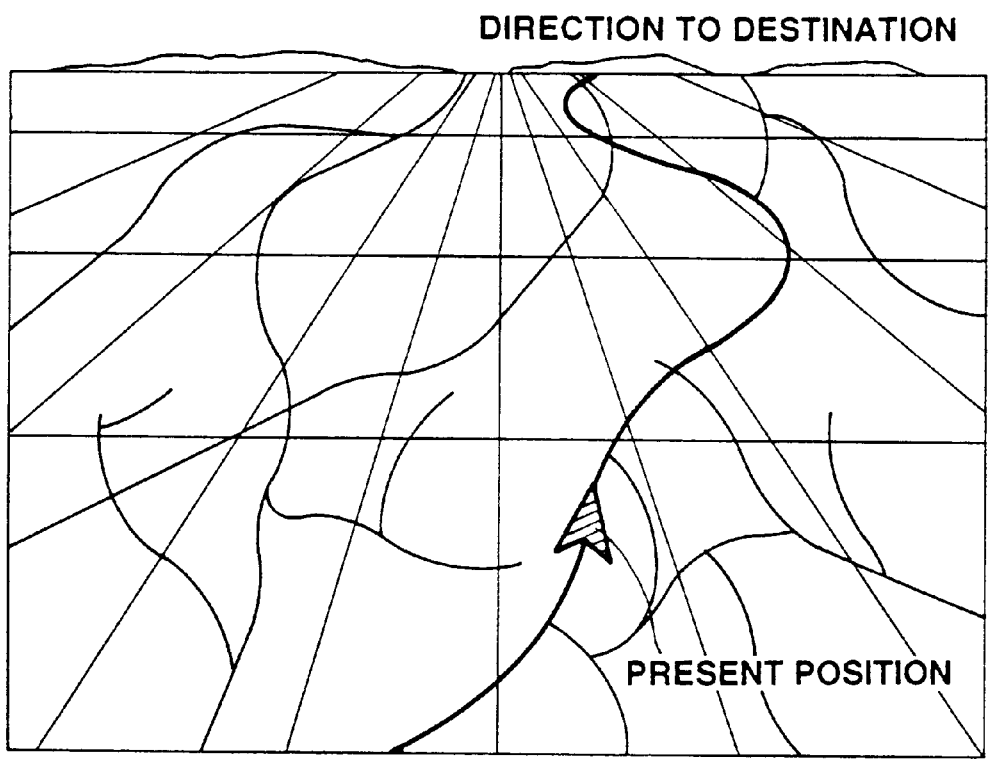
FIG. 8 is an explanatory view for explaining a displayed image on a display image screen in the case of the first embodiment.

At a step S7, the CPU 4 stores the bird's eye view display data prepared at the step S6 into the V-RAM 9. Consequently, the road map within the trapezoid region ABCD of FIG. 3A can be displayed on the display unit (display) 5 as shown in FIG. 8.

At a step S8, the CPU 4 reads character data on, for example, names of places and name of intersections included in the road map data within the trapezoid region ABCD of FIGS. 3A and 3B and temporarily stores the V-RAM 9, thus character information such as names of places being superimposed on the road map displayed on an image screen of the display unit 5.

At a step S9, the CPU 4 calculates the present position of the vehicle from a running distance and a forward direction from the position detected at the step S2 using the direction sensor 1 and vehicle speed sensor 2.

At a step S10, the coordinate system of the present position of the vehicle calculated at the step S9 is transformed in the same way as the step S6 so that the present position of the vehicle denoted by the vehicle mark data is stored into the V-RAM 9.

Figure 11:
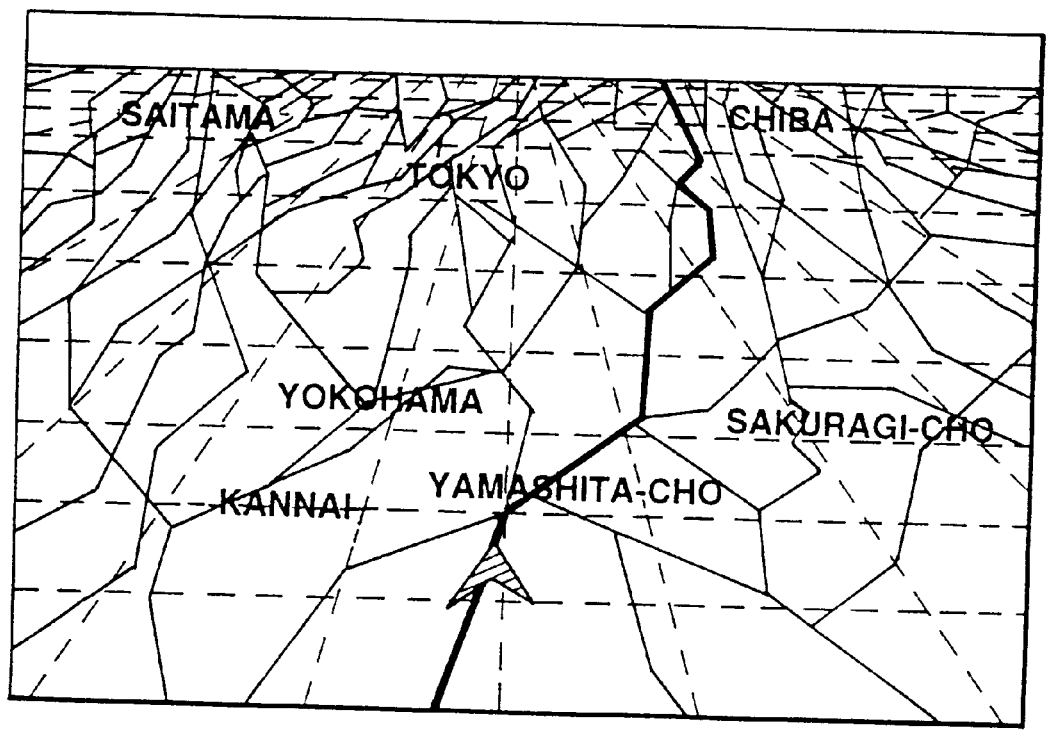
FIG. 11 is an explanatory view of an example of the displayed image screen of the bird's eye view in the case of the second embodiment shown in FIG. 10.

Consequently, as shown in FIG. 11 or FIG. 4, the arrow-marked present position of the vehicle is displayed.

At a step S11, a movement vector quantity of the vehicle upon the display of the road map at the step S7, that is to say, a movement direction and a movement distance are detected and if the movement vector quantity has exceeded a predetermined quantity, the routine goes to the step S4 so that an updating of the bird's eye view on the display image screen of the display unit 5 is carried out. Consequently, the surrounding place around the present position of the vehicle is always extensively displayed on a lower end area of the display image screen of the display unit 5 in the scale extended form and the rewriting of the bird's eye view to be displayed on the image screen of the display unit 5 is carried out along with the running of the vehicle on the set route of travel.

FIG. 7 shows a detailed processing flowchart of the step S5 in FIG. 6.

Figure 9:
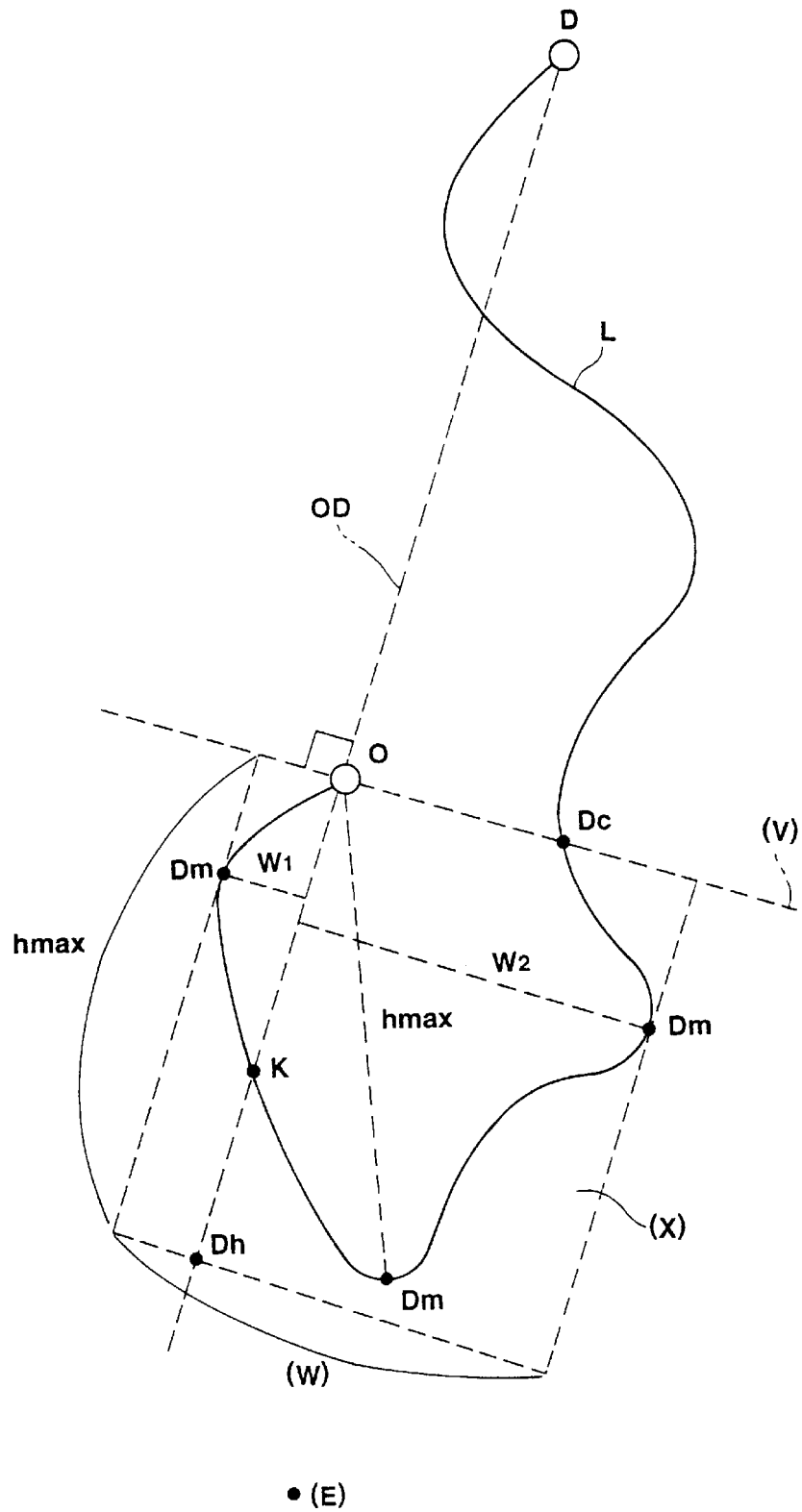
FIG. 9 is an explanatory view for explaining the displaying method executed in the subroutine of the step S5 in FIG. 7.

FIG. 9 shows an example of the road map data read out from the road map memory 3 at the above-described step S4 in which a hairpin curve, i.e., U-shaped turning road forwarding in the direction opposite to that of the set destination is present on the set (optimum) route of travel to the set destination denoted by a bold line.

The explanation of FIG. 7 will be described below with reference to FIG. 9.

At a step S21 of FIG. 7, the CPU 4 determines a direction of a line segment OD connecting the present position of the vehicle 0 detected at the step S2 and set destination D read at the step S1, as appreciated from FIG. 9.

At a step S22 of FIG. 7, the CPU 4 determines a direction of a straight line (V) (as shown in FIG. 9) which is perpendicular to the line segment OD and is passing through the present position of the vehicle denoted by 0 in FIG. 9.

At a step S23, the CPU 4 detects a position of a crossing point Dc between the straight line (V) and optimum route of travel L.

At a step S24 of FIG. 7, the CPU 4 derives each of an area Sm of a triangular region ODcD with each node Dm (wherein, $1 \leq m \leq n$, n denotes a total number of the nodes) present on the part of the set (optimum) route of travel between the present position O of the vehicle and the crossing point Dc as a vertex of the triangular region and with the line segment ODc as a bottom side.

At a step S25, the CPU 4 determines a maximum value of the derived Sm (wherein, $1 \leq m \leq n$) at the step S24 and derives a height of its corresponding triangular region from which the maximum value described above is determined, the height hmax being defined as a vertical distance from the line segment ODc to the node Dm).

At a step S26, the CPU 4 determines a position of a point Dh hmax away from the present position of the vehicle 0 and whose angle of direction is 180 degrees different from the set destination D.

At a step S27, the CPU 4 determines whether any point at which the line segment ODh is intersected with the set route of travel L is present.

In the case of FIG. 9, since the line segment ODh is intersected with the set route of travel L at the point K, the positive acknowledgment is determined at the step S27 and is transferred to a step S28.

At the step S28, the CPU 4 derives each area S1m of a triangular region ODhDm with each node Dm placed at a left side of the line segment ODh (wherein, $1 \leq m \leq p$, p denotes a total number of nodes present at the left side of the line segment ODh) as its vertex and derives each area of another triangular region ODhDm with the line segment ODh as its bottom side and each node Dm (wherein, $1 \leq m \leq q$, q denotes a total number of nodes present at the right side of the line segment ODh) as its vertex.

At a step S29 of FIG. 7, the CPU 4 determines the maximum values of the areas from each area S1m (wherein, $1 \leq m \leq p$) and each area Srm (wherein, $1 \leq m \leq q$). The CPU 4, then, heights of w1 and wr of the triangular regions determined therein and derives a sum W of the heights w1 and wr. Then, the subroutine goes to a step S30.

At a step S30 of FIG. 7, the viewing point (E) of the bird's eye view is set at a position of an upper sky from which the road map including the range of the triangular region X in which the derived W at either the step S29 or S32 are longitudinal length and lateral length can be looked down over.

For example, when the height w2 is larger than the height w1, as shown in FIG. 9, the upper sky above the point (E) shown in FIG. 9 and placed at the right side of the line segment ODh is set as the viewing point (E) of the bird's eye so as to enable the whole rectangular region X to be looked down over.

As described above, in the first embodiment, the line of sight from the viewing point (E) of the bird's eye view is varied according to a length and direction of the hairpin curve on the set route of travel and the bird's eye view is displayed on the display image screen of the display unit 5. Thus, all of the hairpin curves can be displayed thereon.

Although, in the first embodiment, the viewing point (E) is set at the position so as to enable the whole rectangular region enclosing the hairpin curve to be viewed, the height of the viewing point and line of sight direction may alternatively be varied according to the length and direction of the hairpin curve.

For example, in the case where the hairpin curve is relatively long, the displayed region on which the set destination direction can be displayed becomes narrower if all of hairpin curves on the set route of travel are displayed. In this case, only a part of the hairpin curve displayable region may be displayed, for example, as shown in FIG. 4.

Alternatively, a special switch used to determine whether the operator desires for the display unit 5 to display the hairpin curve region may be alternatively installed so as to be connected to the interface circuit 10.

In addition, in place of the operation keyboard 8, a touch panel switch integrated with the display unit 5 may be used. Furthermore, the keyboard 8 may serve to directly input the set destination into the interface circuit 10.

Although, in the first embodiment, the present position of the vehicle is specified using the direction sensor 1 and vehicle speed sensor 2, the present position of the vehicle may be determined according to the input information through the keyboard 8. Or alternatively, a GPS (Global Positioning System) using electromagnetic waves from a plurality of satellites may be used to specify the present position of the vehicle.

Although, in the first embodiment, the optimally (set) route of travel is derived from the calculation of the CPU 4 (step S3 of FIG. 6), the vehicle may be guided in accordance with an input route of travel prepared by the keyboard 8 and the bird's eye view can accordingly be displayed.

Second Embodiment

Figure 10:
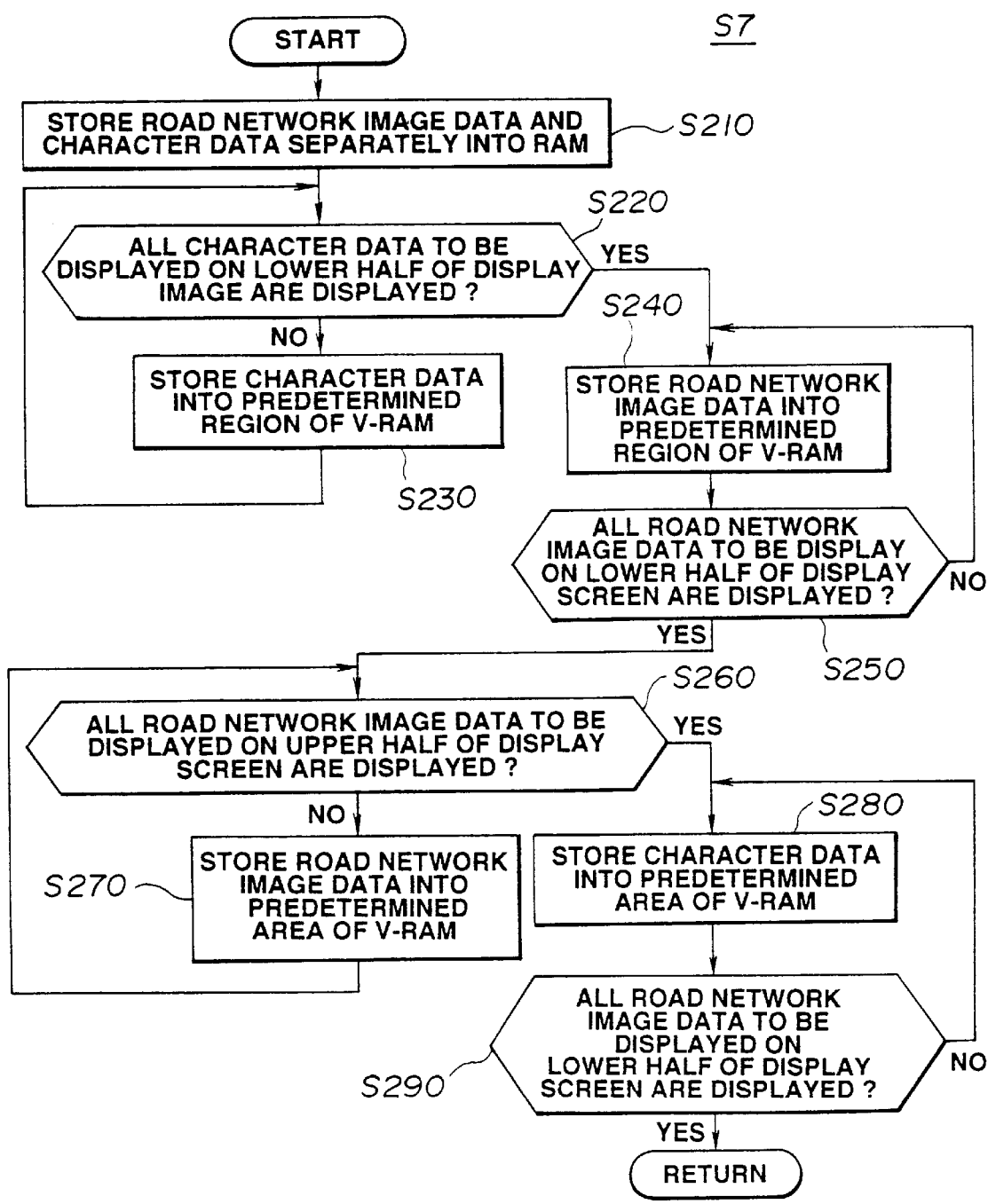
FIG. 10 is an operational flowchart of the navigating apparatus in a second preferred embodiment according to the present invention.

FIG. 10 shows a subroutine of the step S5 in a case of a second preferred embodiment of the vehicular navigation apparatus and method according to the present invention.

It is noted that the main routine of the second embodiment is the same as shown in FIG. 6 and its hardware structure is the same as shown in FIG. 5.

At a step S210 of FIG. 10, the CPU 4 divides the coordinate transformed data of the step S6 into two classes, i.e., the road network image data and character data representing the names of places and stores them into the RAM 7, respectively. Here, the coordinate position information representing at which position on the display image screen the respective data are displayed is also stored.

At a step S220 of FIG. 10, the CPU 4 determines whether all of the character data to be displayed on a lower half of the display image screen have been displayed on the display image screen of the display unit 5 from among the character data stored in the RAM 7.

If No at the step S220, the subroutine goes to a step S230 in which the character data not yet to be displayed on the display image screen of the display unit 5 are stored in a predetermined region of the V-RAM 9 which corresponds to the display position of the display unit 5. It is noted that the storage region of the V-RAM 9 corresponds exactly to the display region of the image screen of the display unit 5. If the data are stored in the predetermined region of the V-RAM 9, the data stored thereinto are displayed onto the part of the display region which corresponds to the storage region described above. Hence, at the processing of the step S230, the character data are displayed on predetermined regions of the lower part of the display image screen.

When the processing at the step S230 is ended and when all of the character data have been displayed on the lower half of the display image screen the subroutine returns to the step S240. At the step S240, the CPU 4 stores a part of the road network image data stored in the RAM 7 which is to be displayed on a lower half of the display image screen into the corresponding region of the V-RAM 9. Consequently, the road network image data are written onto the displayed character data displayed on the display unit 5 as appreciated from FIG. 11.

At a step S250, the CPU 4 determines whether all of the road network data to be displayed on the lower half of the display image screen have been displayed on the display image screen of the display unit 5. If No at the step S250, the subroutine returns to the step S240 and if Yes at the step S250, the subroutine goes to a step S260.

At the step S260, the CPU 4 determines whether the part of the road network image data to be displayed on the upper half of the display image screen has already been displayed on the display image screen.

If No at the step S260, the subroutine returns to a step S270 and the road map image data which is not yet displayed on the display image screen is stored into a corresponding region of the V-RAM 9.

When the process at the step S270 is ended, the subroutine returns to the step S260 in which the CPU 4 determines that the road network data has been displayed on the upper half of the display image screen and the subroutine returns to the step S280.

At the step S280, the character data to be displayed on the upper half of the display image screen is stored into the corresponding region of the V-RAM 9. Consequently, the character data are written onto the road network image data already displayed on the display image screen of the display unit 5, as shown in FIG. 11.

At a step S290, the CPU 4 determines whether all of the character data to be displayed on the upper half of the display image screen have already been displayed. If No at the step S290, the subroutine returns to a step S280. If Yes at the step S280, the processing of FIG. 10 is ended.

In the second embodiment, since the road network data is written onto the character data on the road map at the display region of lower half of the display image screen at which the surrounding area around the present position of the vehicle is essentially displayed, the road network can be viewed and recognized in details even if both of the character data and road network image data are superimposed together. On the other hand, since the character data are written onto the road network image data at the display region of the upper part of the display image screen at which the direction of the set destination is indicated, the direction toward the set destination can be recognized by the character thereof. FIG. 11 shows an example of the bird's eye view of the road map carried out in the case of the second embodiment.

Although, in the second embodiment, the upper writing order is switched between the road network image data and the character data, the switching therebetween may be carried at the position except the intermediate (i.e., upper and lower halves) position or at which position the switching is carried out may be arbitrarily selected. Or alternatively, the switching position may automatically be determined according to a density of the road networks to be displayed on the screen and displayed map range.

Furthermore, the upper writing order may be changed according to, for example, a distance from the present position of the vehicle.

That is to say, in a case where the part of the road map from the present position within a predetermined distance is to be displayed, the road network data may be written onto the character data and in a case where the part of the road map exceeding the predetermined distance is displayed, the character data may be written onto the road network image data. It is noted that the predetermined distance described above may correspond to the boundary between the upper half and lower half of the display image screen.

It is also noted that since when the road network data are written onto the character data, it is not easy to recognize or to read the character data, a display color of the road network data at the overlapped (or superimposed) parts may be changed so that the colors of both character data and that position of the road network image data are different.

Although, in the second embodiment, the bird's eye view is displayed on the image screen of the display unit, it is possible to smoothly guide the vehicle with the road network image data on the surrounding of the present position of the vehicle displayed with a priority in a case where a normal top viewed road map data is displayed in place of the bird's eye view.

Third Embodiment

Figure 14:
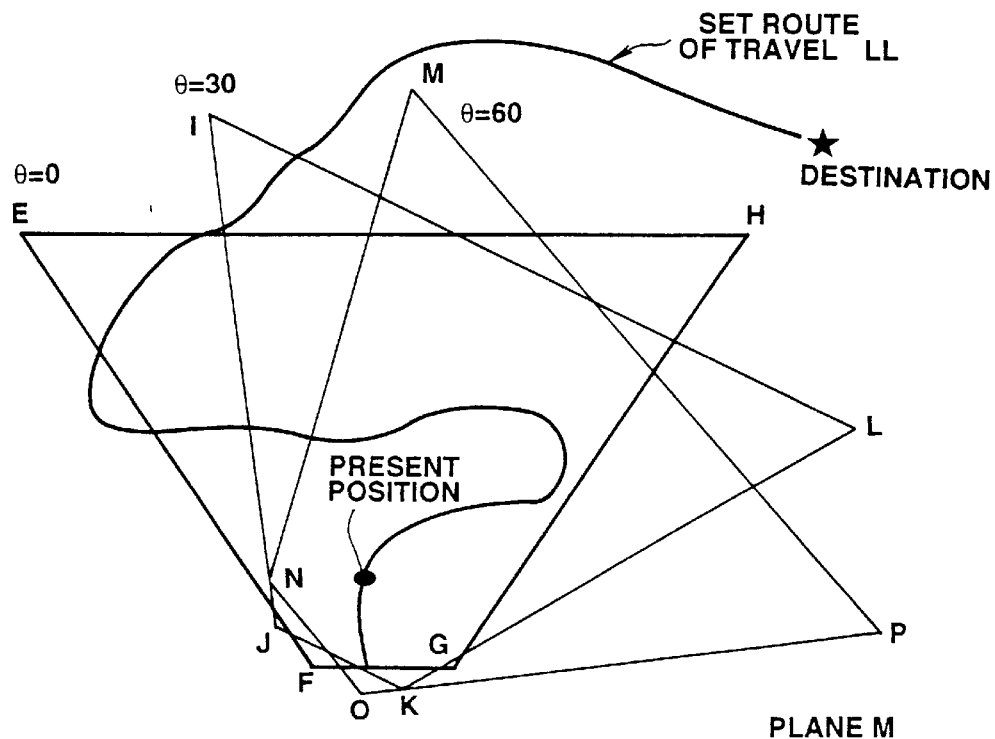
FIG. 14 is an explanatory view for explaining a relationship between a direction of a line of sight and a range of the road map displayed on the display unit in the case of the third embodiment.

FIG. 14 shows an explanatory view how the range of the road map displayed on the display image screen is varied when a line of sight direction of the bird's eye is varied for each of 30°. Each of trapezoid regions EFGH, IJKL, and MNOP denotes a road map range to be displayed on the display image screen in each of the lines of sights of the bird's eye views.

Figure 13:
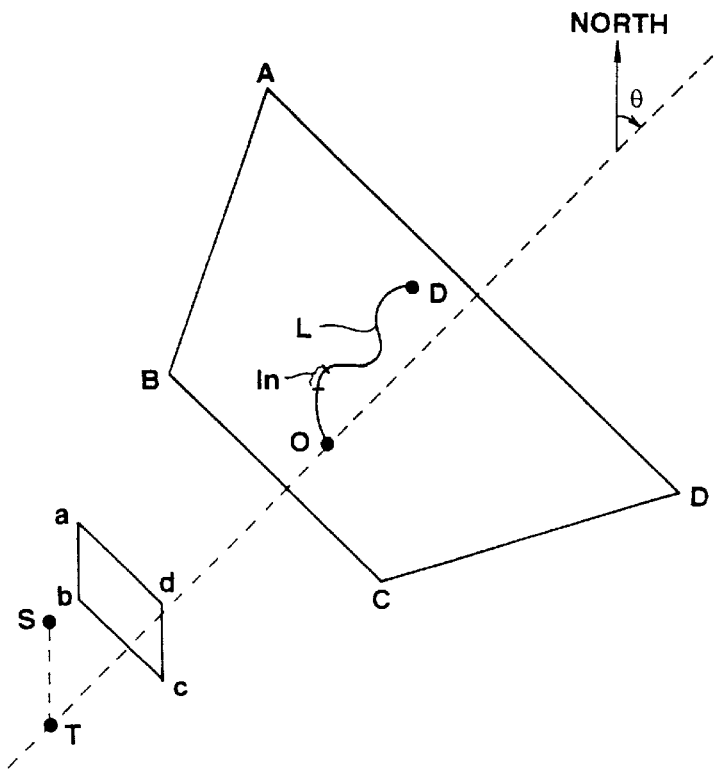
FIG. 13 is an explanatory view for explaining a positional relationship between a viewing point and the present position of the vehicle in the case of the third preferred embodiment shown in FIG. 12.

Although a length of the distance of the set route of travel LL shown in FIG. 14 and displayed on the image screen which provides the maximum corresponds to the trapezoid region ABCD shown in FIG. 13 (or FIGS. 3A or 3B), the length of the set route of travel displayed within each trapezoid region is accordingly varied if the general direction of the whole set route of travel is different. That is to say, if the bird's eye view is displayed without consideration of the general direction of the set route of travel, the set route of travel cannot be displayed with a sufficient length thereof.

Figure 12:
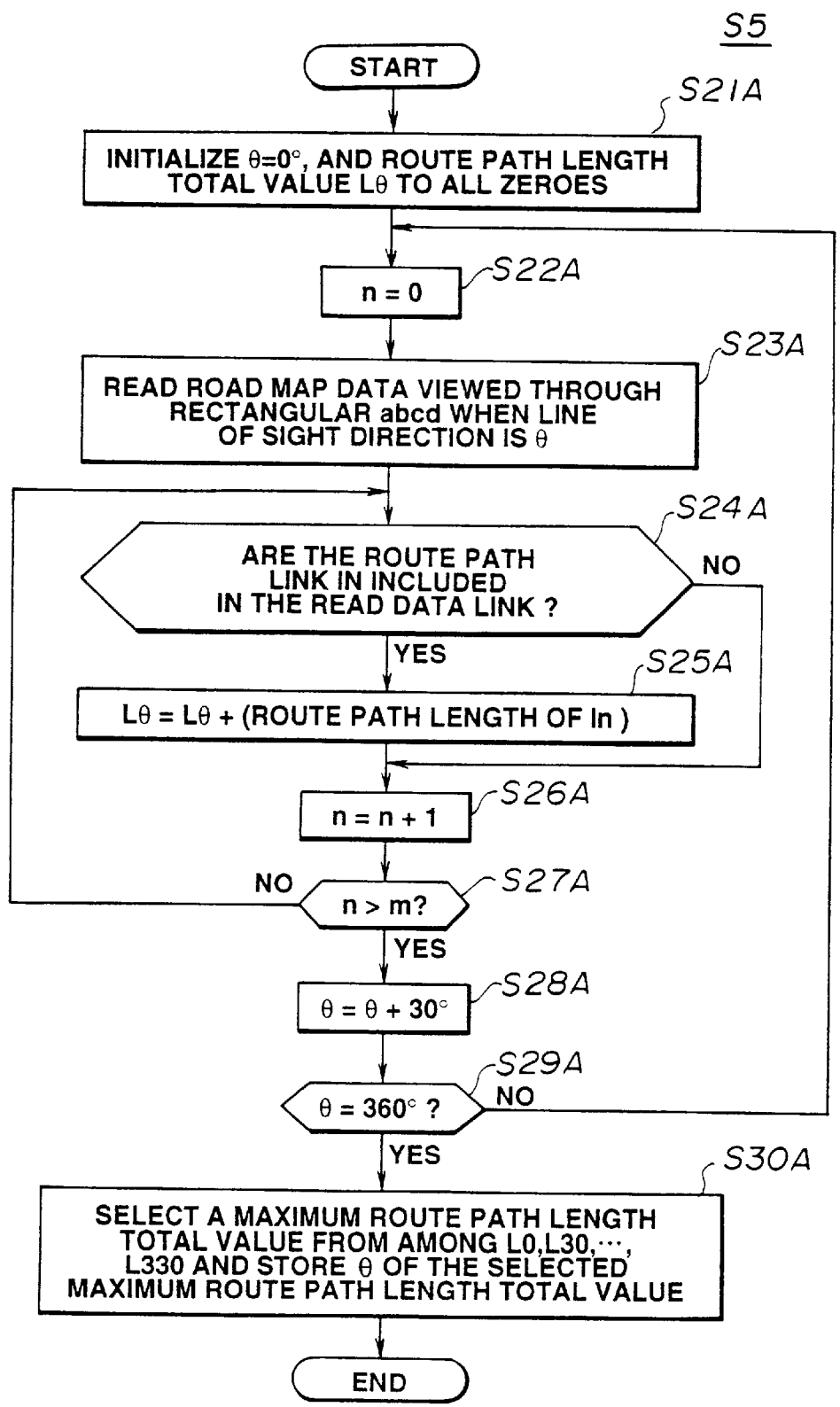
FIG. 12 is an operational flowchart of a subroutine of a step S5 in FIG. 6 in a case of a third preferred embodiment of the vehicular navigating apparatus according to the present invention.

FIG. 12 shows a subroutine of the step S5 shown in FIG. 6 in a case of a third preferred embodiment according to the present invention.

The main routine of the third embodiment is the same as that shown in FIG. 6 of the first embodiment and the hardware structure of the vehicular navigation apparatus in the third embodiment is the same as shown in FIG. 5.

It is noted that at the step S6 of FIG. 6, the CPU 4 carries out the coordinate system transformation of the road map data within the range of the trapezoid region ABCD according to the position of the viewing point E and positional relationship between the position of the rectangular abcd and road map position into the data to be displayed on the display image screen of the display unit 5. Specifically, the part of the road map at a side BC is displayed on a lowest side of the display image screen of the display unit 5 and the part of the road map at a side AD is displayed on an upper side of the display image screen. In addition, the reduction scale percentage becomes large as the position approached from the side AD to the side BC. It is noted that the viewing point position and height of the viewing point are defined such that, for example, the sides of BC and AB are 300 m and 10 Km in their actual dimensions and the distance from the side CD to the side AB is 10 Km in the actual dimension.

It is also noted that when the series of processing of FIG. 12 are executed, the viewing point S is set on an upper sky in a direction of (180°+θ°) with the North direction of the road map as a θ=0° and on an upper sky above a point T which is remote a predetermined distance from the present position of the vehicle G, as shown in FIG. 13. Then, the rectangular region abcd indicating the display range is set at a predetermined position between the viewing point S and present position of the vehicle G.

At a step S21A of FIG. 12, the CPU 4 initializes such that a θ=0° and total values Lθ (wherein, θ=0°, 30°, - - -, 300°) of the path lengths of route links are all zeroed. The term route links denote roads (links) connecting between the adjacent nodes on the set route of travel. In the third embodiment, the route links of m-th numbers on the set route of travel are denoted by $l_1$ through $l_m$ in the order from the present position to the destination.

At a step S22A, a variable n is set to zero. The variable n denotes a variable to specify one of the route links on the set route of travel. That is to say, $l_n$ denotes the n-th number route link from the present position of the vehicle.

At a step S23A, the CPU 4 reads the road map data in a range of the road map which can be viewed through the rectangular abcd, with the line of sight directed toward the direction θ from the viewing point position.

That is to say, the CPU 4 reads the road map data in the range of the trapezoid region ABCD shown in FIG. 13.

At a step S24A, the CPU 4 determines whether the data related to the route link $l_n$ in the road map data read at the step S23A, that is to say, determines whether the route link $l_n$ can be displayed on the display image screen of the display unit 5 when the bird's eye view is displayed with the line of sight direction set as θ.

If the determination is acknowledged at the step S24A, the subroutine goes to a step S25A in which the path length of $l_n$ is added to the total value of the route path length Lθ. Then, the subroutine goes to a step S26A. On the other hand, if the determination is not positive acknowledgment at the step S24A, the subroutine goes to the step S26A in which the variable n is added to one.

At a step S27A, the CPU 4 determines whether the variable n is larger than m indicating the total number of the route links.

If No at the step S27A, the subroutine goes to the step S24A and if Yes at the step S27A, the subroutine goes to a step S28A. At the step S28A, the line of sight direction θ is added to 30°.

At a step S29A, the CPU determines whether θ=360°. If No at the step S29A, the subroutine returns to the step S22A. If Yes at the step S29A, the subroutine goes to a step S30A. At the step S30A, the CPU 4 selects one of the total values which is largest from the respective route lengths of L0, L30, L60, - - - , L330. The corresponding angle of θ is stored in the RAM 7. Then, this subroutine is ended.

In the third embodiment shown in FIG. 12, the direction of line of sight is varied for each 30 degrees, the total values of the route path lengths of the route links displayed on the display image screen of the display unit 5 are derived for the respective directions of the line of sight, and one of the directions of line of sight is automatically selected which provides the displayed longest set route of travel.

Although, in the third embodiment shown in FIG. 12, the comparison of the total values of the route lengths on the set route of travel Lθ with the directions of the line of sights varied for each 30°, the value of the angle may not be fixed as 30°.

The alternatives of the third embodiment are generally the same as those described in the first embodiment.

Fourth Embodiment

Figure 15:
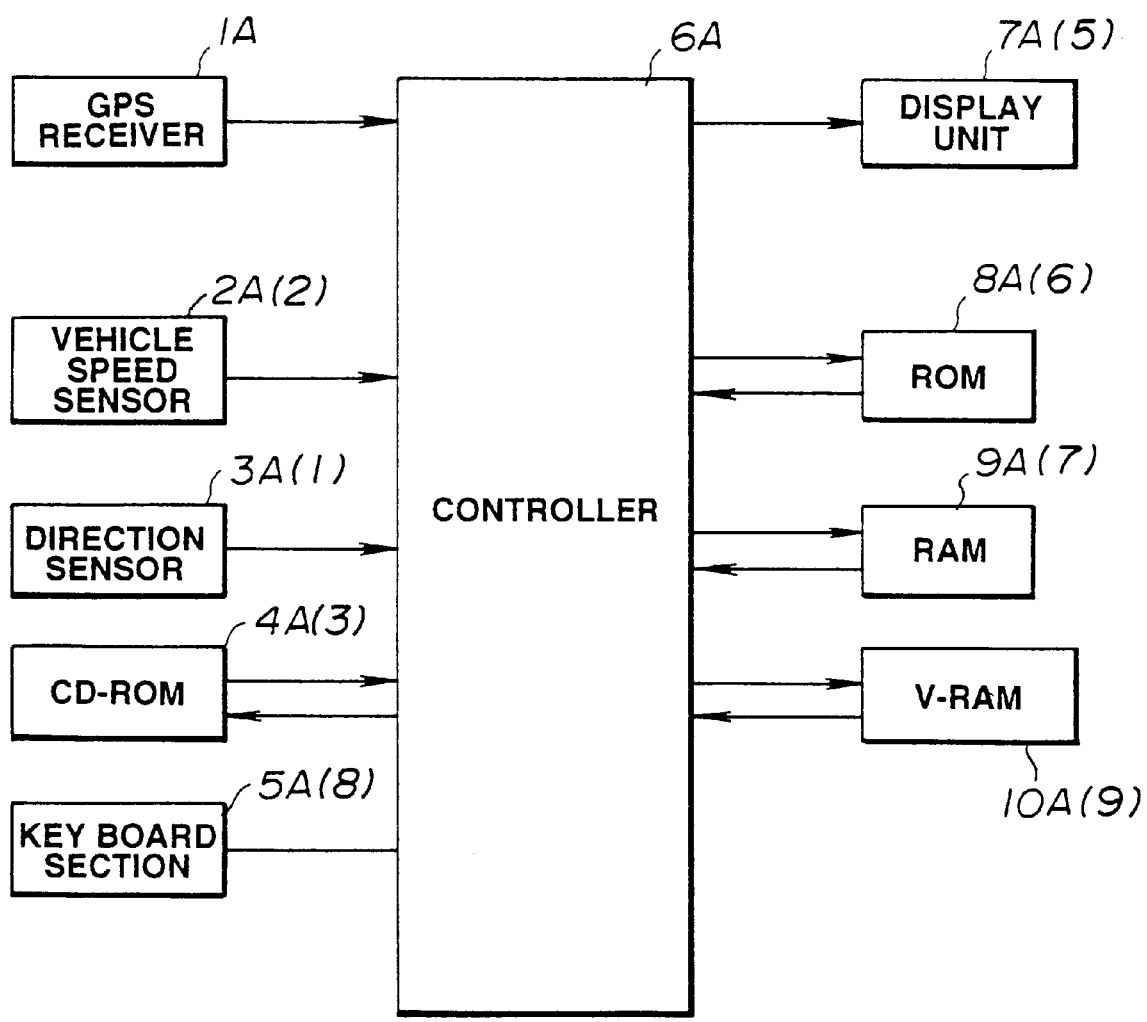
FIG. 15 is a schematic circuit block diagram of the vehicular navigating apparatus in a case of a fourth preferred embodiment according to the present invention.

FIG. 15 shows the vehicular navigating apparatus in a fourth embodiment according to the present invention.

Although the vehicular navigating apparatus shown in FIG. 15 is generally the same as that shown in FIG. 5, the hardware structure will be explained with reference to FIG. 15.

A GPS receiver 1A is connected to a controller 6A for measuring the present position of the vehicle using a GPS navigating method by receiving signal electric waves from the satellites. The GPS receiver 1A is exemplified by the U.S. Pat. No. 4,743,913 issued on May 10, 1988 and U.S. Pat. No. 4,899,285, (the disclosure of which are herein incorporated by reference), so as to detect the present position of the vehicle, forward direction of the vehicle, and running velocity.

The vehicle speed sensor 2A is the same as the vehicle speed sensor 2 of FIG. 5. The direction sensor 3A is the same as the direction sensor 1 of FIG. 5. A CD-ROM 4A detects a road map data and corresponds to the road map memory 3 of FIG. 5. A keyboard section 5A corresponds to the keyboard 8 of FIG. 5 and is provided with various operating members to set the present position, set the destination, and to scroll the displayed road map.

The controller 6A is connected with the display unit 7A, ROM 8A, RAM 9A, and V-RAM 10.

The controller 6A includes a microcomputer and its peripheral equipment.

In the fourth embodiment, color classification is carried out in such a way that freeways (autobahns in German) are in blue, national highways are in red, (regional) normal highways are green, principal roads are in yellow, and streets are in gray in accordance with displayed colors used commonly in a generally available road map book and a display priority order of the roads classified above is such an order as freeways, national highways, normal highways, principal roads, and streets.

In addition, in the fourth embodiment, so-called grid lines (in-line arrangement) are superimposed on the road map at each predetermined interval of space together with the road map in the form of bird's eye view on the display image screen.

It is noted that the grid lines on the bird's eye view do not exactly correspond to the in-line arrangement shape such that the intervals between each one line of the grid lines and adjacent lines of the grid lines become narrower as the displayed part on the bird's eye view becomes away from the present position of the vehicle and a display density of the grid lines becomes high at a displayed part of the display screen near to the set destination. Hence, at the displayed part of the display screen near to the set destination, a viewer of the display unit 7A can view the displayed part as if a background of the road map were painted over by the display color of the grid line. Each interval of the grid line can arbitrarily be set according to the region of the road map displayed on the display unit 7A. For example, 100 mm interval may be appropriate.

Furthermore, in the fourth embodiment, the display color of the grid lines is the same as that of a road having a lowest display priority order. For example, one of the ranks of the roads which has the lowest display priority order is the streets so that the display color of the grid lines is gray as the same as the streets.

As described above, the display density of the displayed color of the grid line becomes high at the display part near to the set destination in the bird's eye view so that the viewer can view the displayed part as if it were painted wholly by the color of gray. Therefore, the streets displayed in gray are hidden in the grid line of the same color as gray and the viewer can view that displayed part as if it did not display the streets.

Figure 16A:
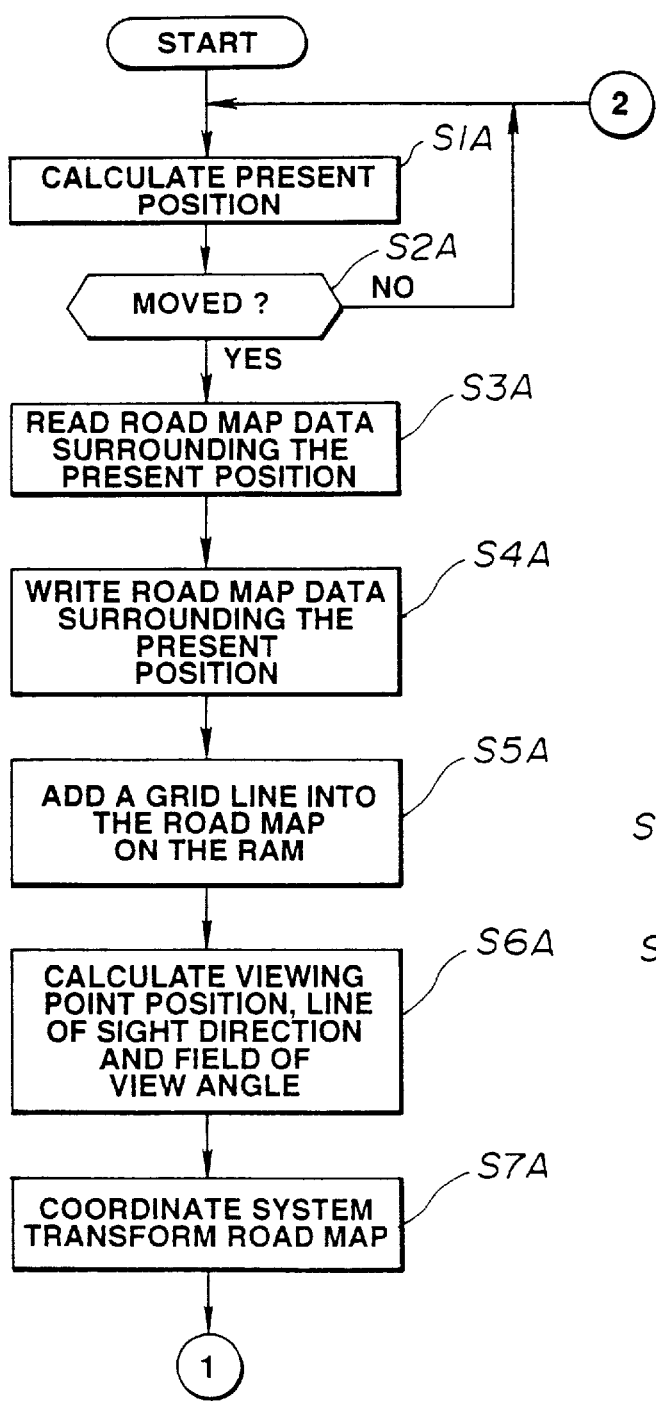
FIGS. 16A and 16B are integrally an operational flowchart for explaining the operation of the navigating apparatus in the case of the fourth embodiment shown in FIG. 15.
Figure 16B:
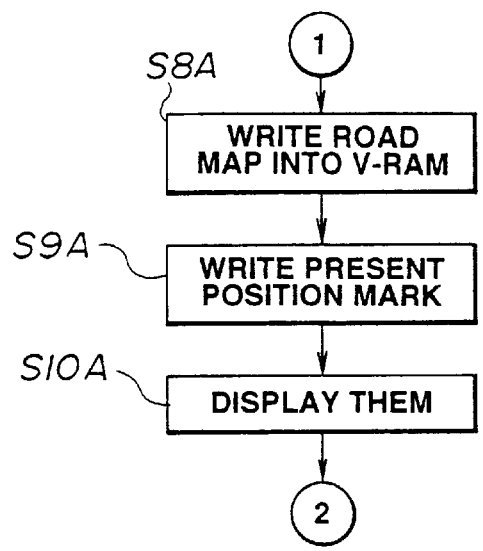

Next, FIGS. 16A and 16B show integrally a display control operational flowchart in the fourth embodiment.

When a main switch of the keyboard section 5A is turned on, the microcomputer of the controller 6A starts the execution of the program shown in FIGS. 16A and 16B.

At a step S1A of FIG. 16A, the microcomputer calculates the present position of the vehicle by means of a self contained navigating method and/or GPS navigating method.

At a step S2A of FIG. 16A, the microcomputer compares the present position of the vehicle calculated at the present time and that calculated at a previous time so as to determine whether the vehicle has moved.

If the microcomputer has determined that the vehicle has moved, the routine goes to a step S3A. If not at the step S2A, the routine returns to the step S1A.

At the step S3A, the microcomputer reads the road map data surrounding the present position of the vehicle from the CD (Compact Disc)-ROM 4A. It is noted that the range of the road map to be read from the CD-ROM 4A is previously set according to a displayable range (size) of the display unit 7A and memory capacities of the RAM 9A and V-RAM 10A.

At a step S4A, the read road map surrounding the present position of the vehicle is written into the RAM 9A in a predetermined painting form. At this time, the roads on the road map are classified in different colors according to the ranks of the roads described above.

At a step S5A, the grid lines having the predetermined interval of space are written in a gray color of display on the road map in the RAM 9A.

The display color of the grid lines is the same as that of the streets to be vanished at a display part of the display image screen of the display unit 7A in the bird's eye view which is far way from the present position of the vehicle (normally, near to the set destination).

At a step S6A, the microcomputer calculates the viewing point (E), the direction of line of sight (EF), and an angle of field of view of the bird's eye view to draw the road map in the form of the bird's eye view. In the fourth embodiment, the viewing point position and field of view angle are set such that the present position of the vehicle is placed at a center of a horizontal direction (left and right) of the display image screen of the display unit 7A and at a position near to a lower end of a vertical direction (upward and downward) of the display image screen of the display unit 7A. It is noted that the direction of line of sight is set in such a direction as the vehicular forward direction or as the direction of the set destination.

At a step S7A, the microcomputer transforms in the coordinate system of the road map according to the viewing point, angle of field of view, and direction of line of sight set at the step S6A.

At a step S8A, the road map transformed in the coordinate system is written into the RAM 10A. At a step S9A, the mark representing the present position of the vehicle is written onto the transformed road map.

At a step S10A, the road map thus written in the RAM 10A is drawn onto the display image screen of the display unit 7A and the routine returns to the step S1A.

Figure 17A:
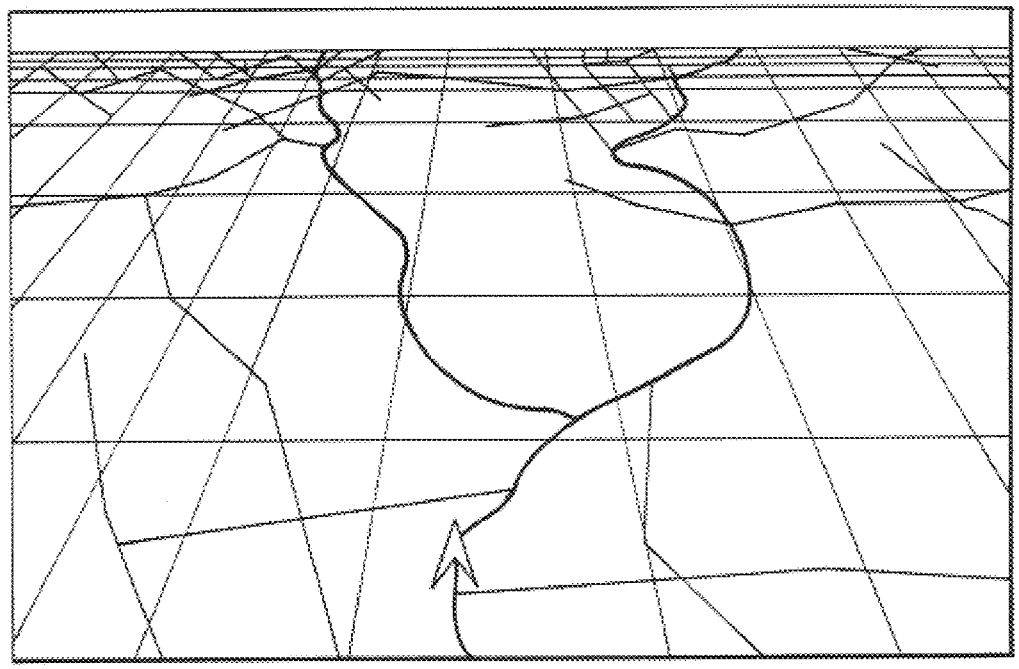
FIG. 17A is an explanatory view of the bird's eye view in which a displayed color of grid lines is the same as that of a road having a low priority order of displayed color.

FIG. 17A shows one of the display image screen executed in the fourth embodiment.

As shown in FIG. 17A, the display color of the grid line to be written onto the road map in the form of the bird's eye view is the same as the display color of the city or town streets having a lowest display priority. Therefore, as shown in FIG. 17A, the streets placed remotely from the present position are substantially hidden in the grid line and cannot clearly be viewed so that the road map can be easier to be viewed (legible).

However, alternatively, the display color of the grid line may be different from that of the rank of road which has the lowest priority order and the display color of each crossing point of the mutual grid line may be the same as that of the rank of the roads having the lowest display priority order. In this way, it becomes easier to distinguish the rank of road having the lowest priority order from the grid line at the part of road map surrounding the present position of the vehicle and the crossing points of the mutual grid lines are concentrated at the part of the road map remotely placed from the present position of the vehicle so that the roads having the lowest display priority order are buried and hidden into the crossing points and the road map becomes easier to be viewed.

Figure 17B:
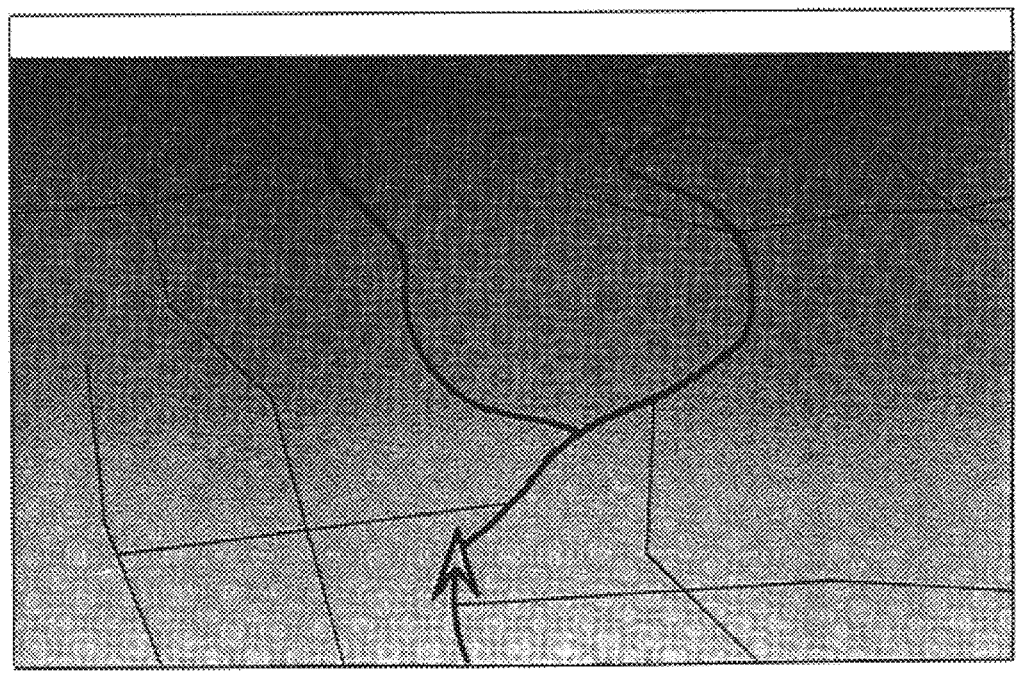
FIG. 17B is an explanatory view of the bird's eye view in which a plurality of dots are painted over the road map in a modification of the fourth embodiment.

In addition, as shown in FIG. 17B, with no grid line displayed on the road map, a plurality of dots (points), having one of the same class of colors as the display color of at least one rank of the roads, may be painted coarsely at the part of the road map surrounding the present position of the vehicle and may be painted finely at the remaining part of the road map which is remote from the present position of the vehicle. In this way, it becomes easier to distinguish the plurality of points (dots) from the roads having the lowest display priority order at the display part of the road map surrounding the present position of the vehicle. On the other hand, at the remaining part of the road map which is remote from the present position of the vehicle, the display image can be viewed as if the background were painted over by the display color of the plurality of points (dots) and the roads of the rank having the lowest display priority order were buried and hidden into the plurality of points (dots). Thus, the road map can be easily viewed and recognized.

Figure 18:
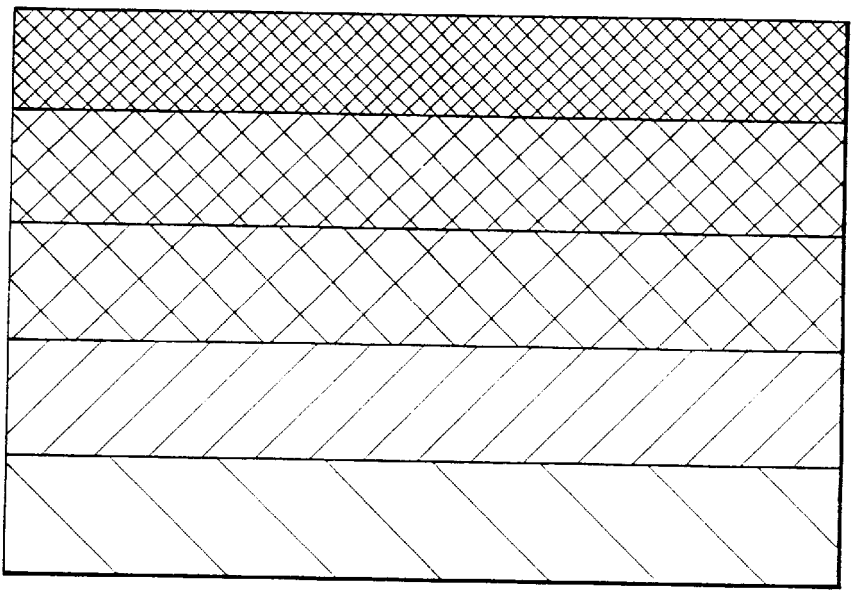
FIG. 18 is an explanatory view of an example of a gradation of a background of the road map.
Figure 19:
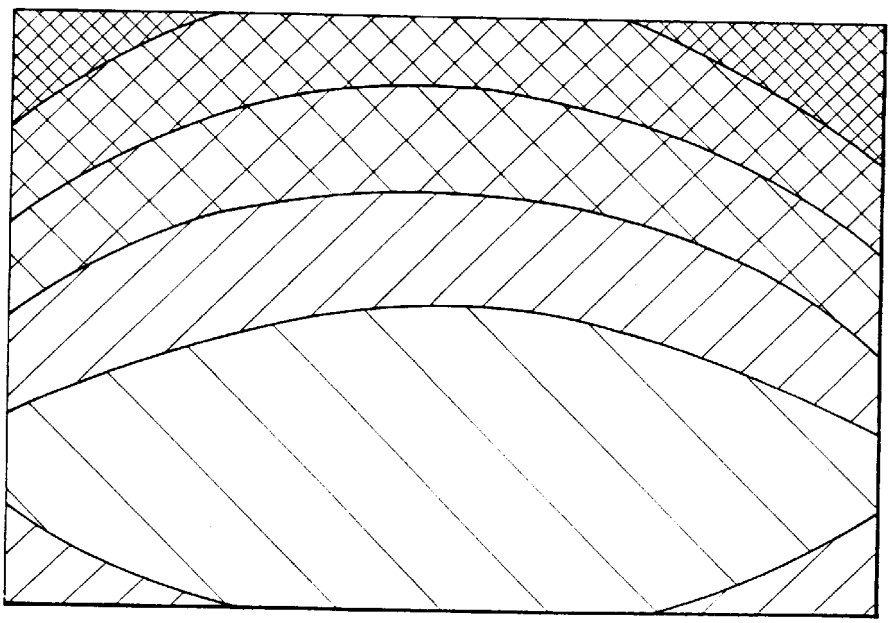
FIG. 19 is an explanatory view of an example of another gradation of a background scenery of the road map.

FIGS. 18 and 19 show modifications of the fourth preferred embodiment in which a gradation of color hues and/or tones is carried out such that a background color of the road map to approaches to one of the same class of colors as that of the roads having the lowest (or lower) display priority order as the display image part of the image screen becomes nearer to the remotest position of the displayed part of the image screen from the present position of the vehicle.

Such a gradation as described above may be carried out in the direction of the line of sight as appreciated from FIG. 18.

Such a gradation as described above may be carried out in a concentric form with the present position of the vehicle as the center as appreciated from FIG. 19.

The hardware structure of the modifications described above is the same as shown in FIG. 15.

Figure 20A:
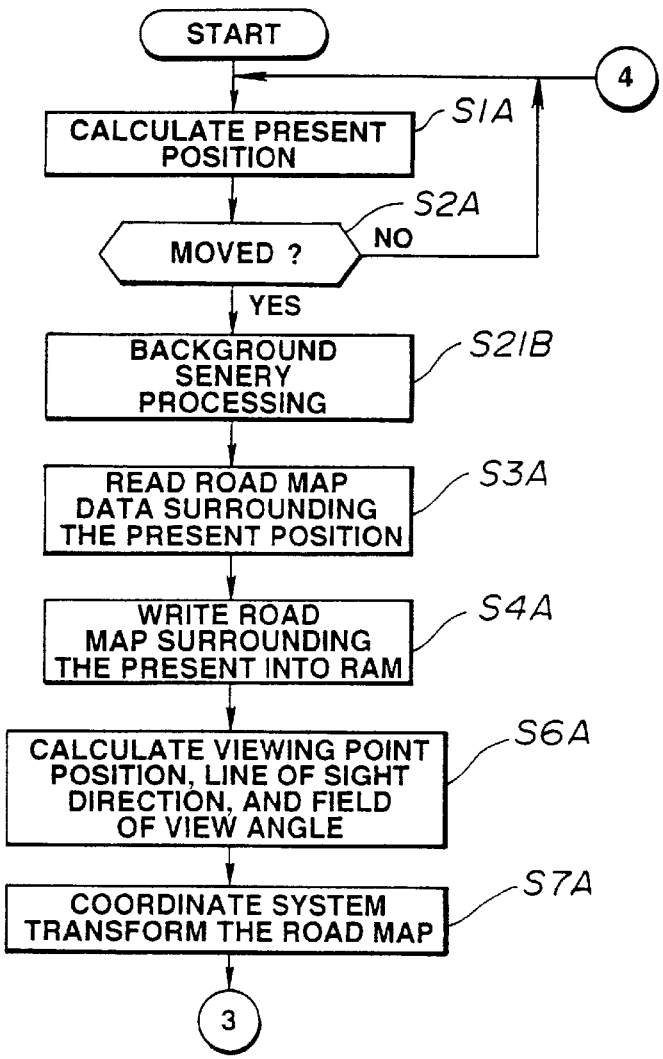
FIGS. 20A and 20B are integrally an operational flowchart of a display control program of the road map as a modification of the fourth embodiment shown in FIGS. 16A and 16B.
Figure 20B:
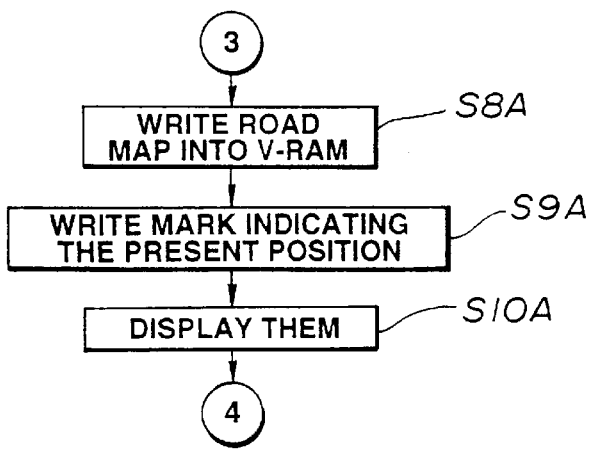

FIGS. 20A and 20B show integrally the display control operational flowchart of each modification of the fourth embodiment of the vehicular navigating apparatus according to the present invention.

It is noted that the same steps of FIGS. 20A and 20B as those shown in FIGS. 16A and 16B are executed in the same ways and, hence, the different step of a step S21B will be described below.

That is to say, after the microcomputer determines that the vehicle has moved at the step S2A, the routine goes to the step S21B.

At the step S21B, the gradation as shown in either of FIGS. 18 or 19 is carried out to process the background of the road map on the displayed image screen of the display unit 7A before the road map is displayed on the screen. It is noted that it is of course that the display unit 7A comprise a full color liquid crystal display device in the same way as in the case of the fourth embodiment.

Upon completion of the background processing, the routine goes to the step S3A and the same series of processing as that shown in FIGS. 16A and 16B is carried out. It is noted that in each of the modifications the grid line is not drawn onto the road map.

Figure 21:
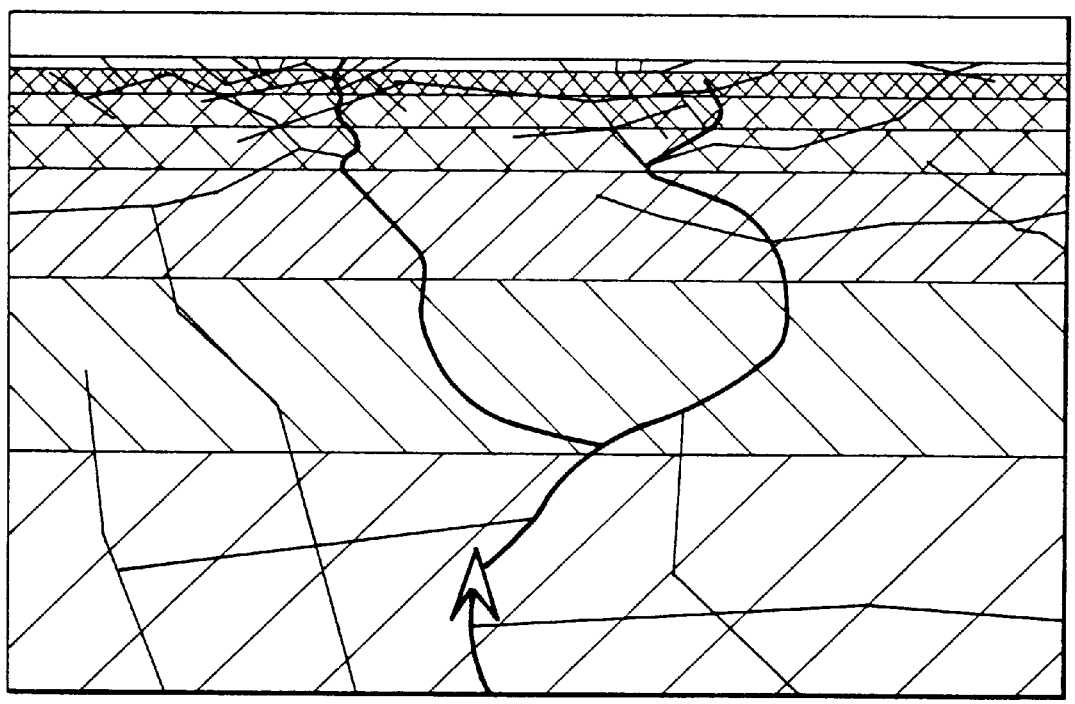
FIG. 21 is an explanatory view for explaining a displayed example in the case of the fourth embodiment in which the gradations are applied to the background scenery.

In each of the modifications of the fourth embodiment, the background color of the road map receives the gradation of either of the color hues or tones such that as the displayed part of the display image screen is more remote from the present position of the vehicle, the background color to approaches to one of the same class of colors as the display color of the streets having the lowest display priority order. Hence, as shown in FIG. 21, parts of streets placed at a portion of the displayed road map remote from the present position of the vehicle are buried and hidden into the background of the road map so that the road map can easily be recognized.

As described above, since, in the fourth embodiment, the grid lines having one of the same class of colors as the display color with which at least one rank of roads is painted (or drawn) on the road map in the form of the bird's view displayed in colors different according to each rank of the roads; the roads which fall in the rank having the color of the same series of colors as the grid line are buried and hidden into the grid line at the part of the display image screen of the display unit which is remote from the present position of the vehicle so that the display image screen can be viewed as if such a rank of roads as described above were not displayed. In other words, at the displayed part of the image screen which is remote from the present position of the vehicle the arbitrary rank of the roads which is not desired to be displayed cannot be viewed. Consequently, it is not necessary to decimate or omit such a rank of roads from the displayed part of the display image screen which is remote from the present position of the vehicle. Then, the road map in the form of the bird's eye view can provide an appropriate road density from the part of the road map surrounding the present position of the vehicle to the set destination.

As described above, since, in the fourth embodiment, the grid lines are painted (or drawn) in one of the same classes of colors as the display color of the rank of the roads having the lowest display priority order, even the streets having the lowest display priority order can visually be recognized at the displayed part of the image screen which surrounds the present position and the remaining ranks of roads such as freeways and national highways can visually be recognized at the remaining part of the display image screen which is remote from the present position of the vehicle with the rank of the roads which has the lowest display priority order buried and hidden into the grid lines.

As described above, since, in the fourth embodiment, the grid lines are painted (or drawn) on the road map in the form of the bird's eye view whose crossing points have one of the same class of colors as the display color of at least one rank of the roads; the rank of the roads whose display color is one of the same class of colors as that of the crossing points of the grid line is buried and hidden into the crossing points at the displayed part of the image screen which is remote from the present position of the vehicle so that the rank of the road described above cannot visually be recognized thereat. The same advantages as described above can be achieved.

In addition, in the fourth embodiment, the crossing points of the grid line are painted (or drawn) in one of the same class of colors as the display color of the rank of the roads whose display priority order is lowest. The same advantages as described above can be achieved.

In addition, in the fourth embodiment, the background of the road map is painted (or drawn) in one of the same class of colors as the display color of at least one rank of the roads. The same advantages as described above can be achieved.

In addition, in the fourth embodiment, the background of the road map is painted (or drawn) in one the same class of colors as the display color of the rank of the roads whose display priority order is lowest. The same advantages as described above can be achieved.

In addition, in the fourth embodiment, the background is painted (or drawn) in the color gradation form (color hue and/or color tone) such that the background color of the part of the displayed road map which is remote from the present position of the vehicle becomes one of the same classes of colors as the display color of at least one rank of the roads. The same advantages as described above can be achieved.

In addition, in the fourth embodiment, the plurality of points (dots) are painted on the road map in the form of the bird's eye view so that the dots located at a surrounding portion of the present position of the vehicle become coarse and those located at a portion of the displayed road map which is remote from the present position of the vehicle become fine. The same advantages as described above can be achieved.

Furthermore, in the fourth embodiment, the plurality of points (dots) are painted on the road map in the form of the bird's eye view having one of the same class of colors as the display color of the rank of the roads whose display priority order is lowest. The same advantages as described above can be achieved.

Fifth Embodiment

Figure 22:
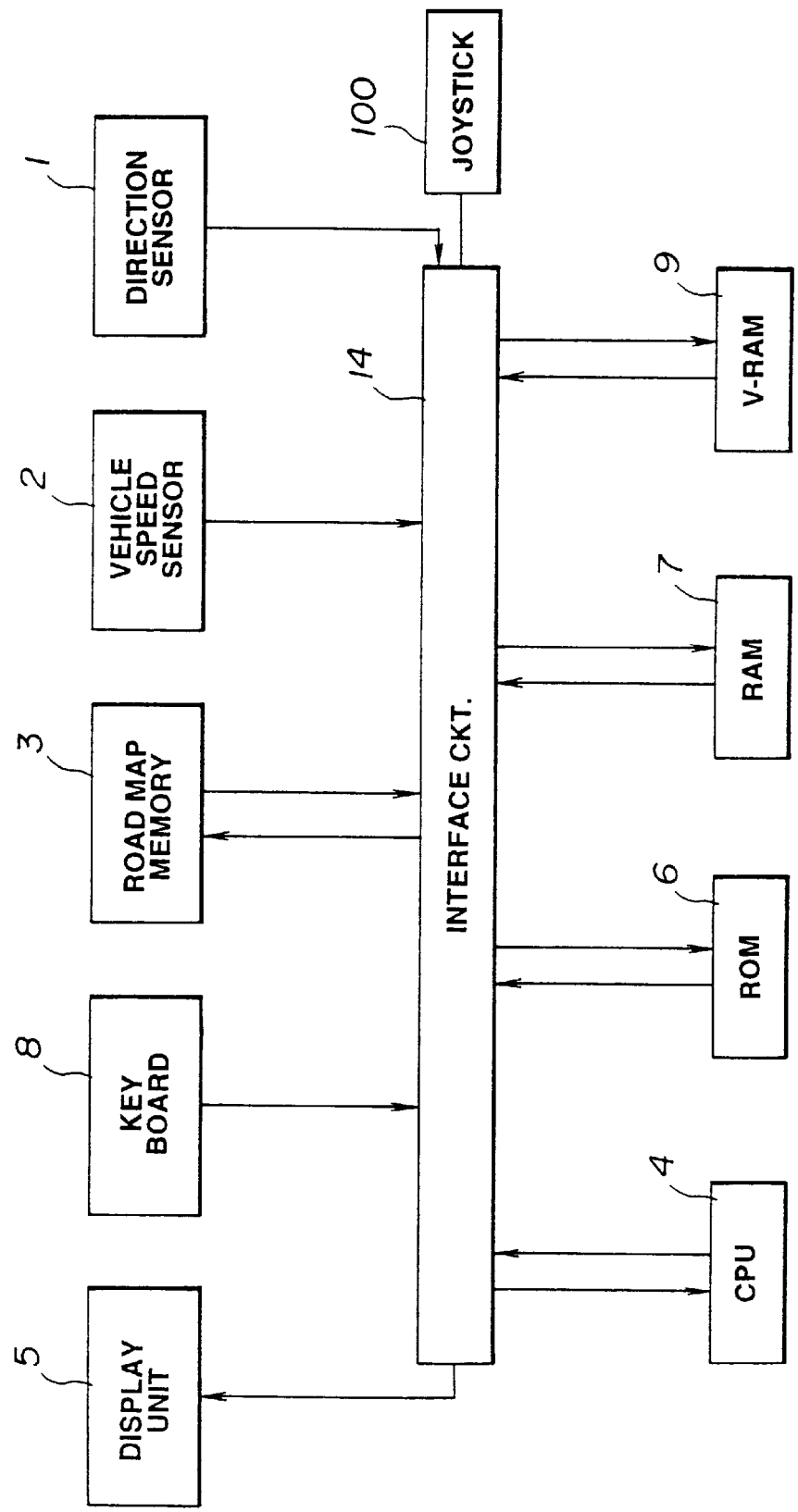
FIG. 22 is a schematic circuit block diagram of the vehicular navigating apparatus in a fifth preferred embodiment according to the present invention.

FIG. 22 shows a schematic circuit block diagram of a fifth embodiment of the vehicular navigating apparatus according to the present invention.

The hardware structure of the fifth embodiment shown in FIG. 22 is generally the same as the first embodiment as shown in FIG. 5 except the addition of a joystick 100.

Figure 23:
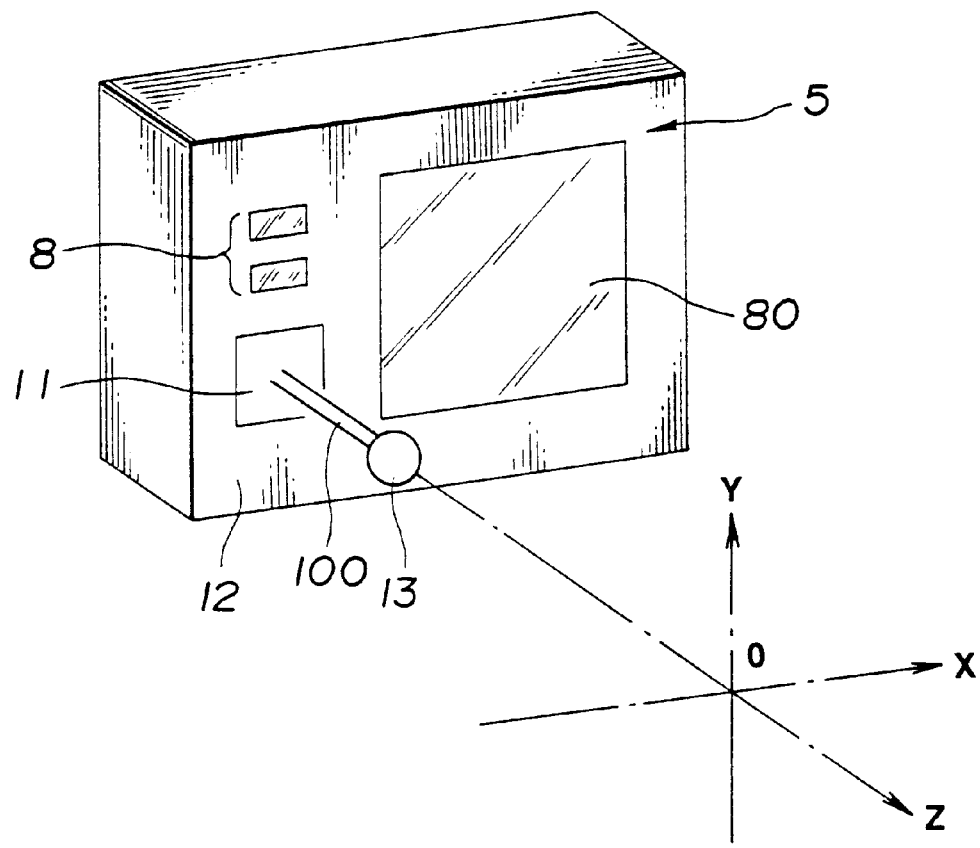
FIG. 23 is an explanatory front view of a display panel in the case of the fifth embodiment shown in FIG. 22.

The joystick 100 is provided for scrolling the road map data on the display screen 80 of the display unit 5 as shown in FIG. 23. The display unit 5 is provided with the keyboard 8 located aside from the display image screen 80 to serve to input the destination and the joystick 100.

As shown in FIG. 23, elastic member made of a rubber or spring denoted by 11 is attached onto a lower end of the joystick 100 which is connected to an upper surface of a display panel 12. A handle 13 having a ball shape is disposed on a tip of the joystick 100.

The joystick 100 can be rotated in a semispherical shape with its lower end as the center. Its rotation variable can indicate respective operating variables in an X-axis direction and Y-axis direction.

For example, suppose that the joystick 100 is rotated through an angle of θ with respect to a Z-axis and through an angle of φ with respect to the X-axis.

At this time, the operating variable ΔX in the X-axis direction and that ΔY in the Y-axis direction are expressed as in the following equations (1) and (2).

$$\Delta X = L \cdot \sin\theta \cdot \cos\phi \quad (1),$$

$$\Delta Y = L \cdot \sin\theta \cdot \sin\phi \quad (2),$$

In addition, when the joystick 100 is operated in the Z-axis direction, the elastic member 11 located on the lower end of the joystick 100 is expanded or reduced so that the operating variable in the Z-axis direction is indicated according to a displacement of the joystick 100 caused by the expansion or shrinkage of the elastic member 11.

Figure 24A:
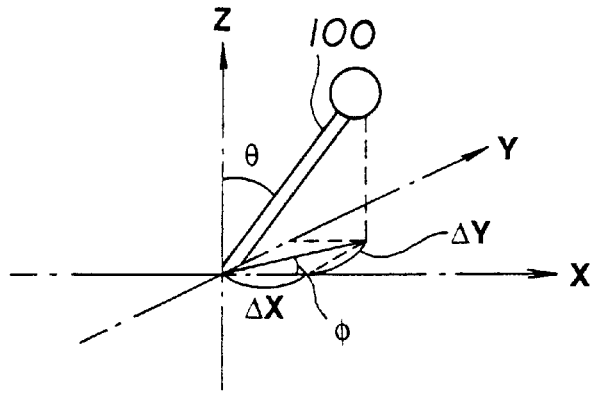
FIGS. 24A, 24B, and 24C are sequentially explanatory views for explaining a series of operations for a joystick 10 shown in FIG. 22.
Figure 24B:
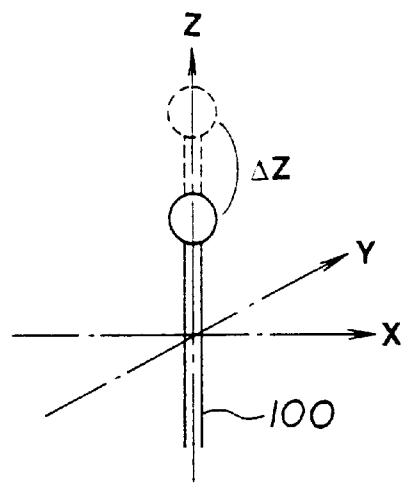

For example, when the joystick 100 is pushed by Z1 in a negative direction with respect to the Z-axis direction, namely, as shown in FIG. 24B, toward the direction to the display panel 12 by Z1, the operating variable ΔZ of the joystick 100 is expressed as:

$$\Delta Z = Z1 \quad (3)$$

Figure 25:
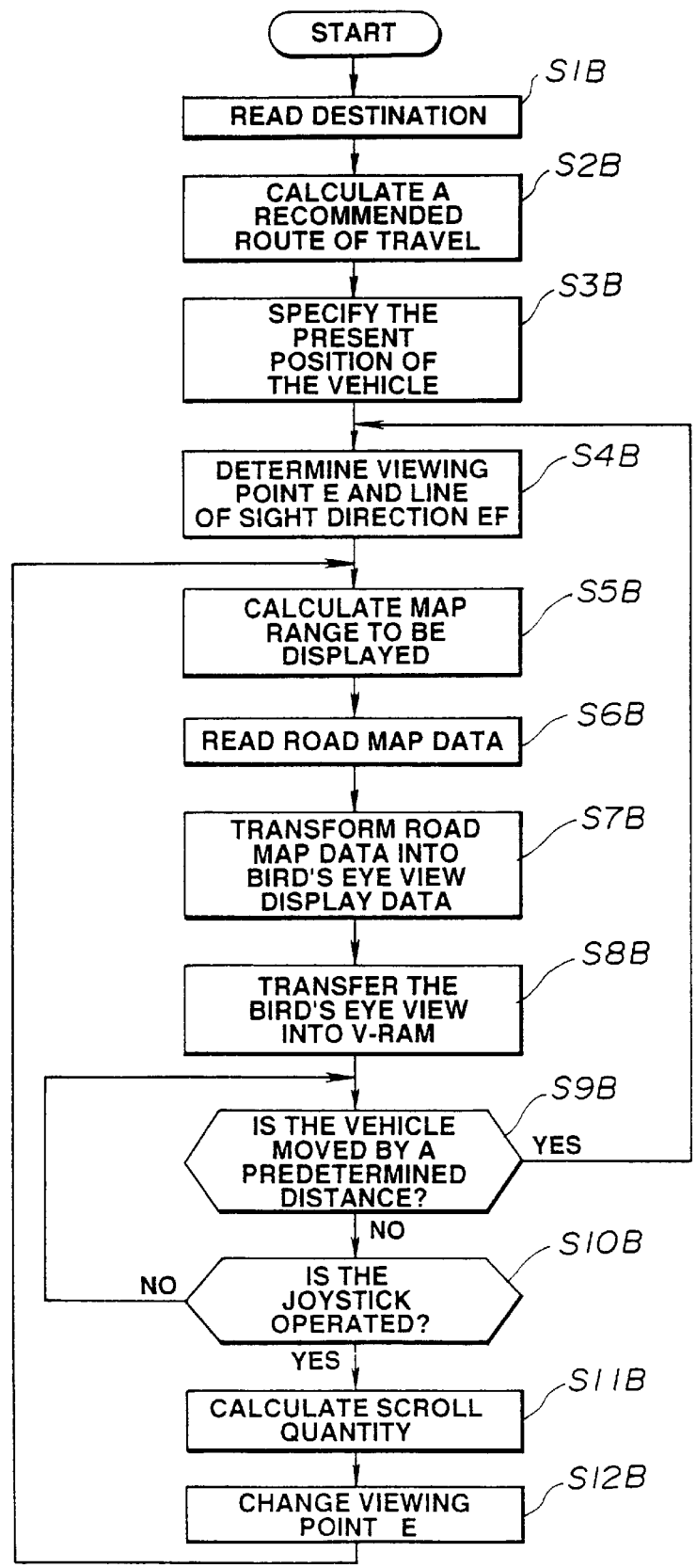
FIG. 25 is an operational flowchart for explaining an operation of a CPU shown in FIG. 22.

FIG. 25 shows an operational flowchart executed by the CPU 4 in the case of the fifth preferred embodiment according to the present invention.

In same way as in the case of the first embodiment, when the vehicular ignition key is turned to either of the ACC, IGN, or START position, the program shown in FIG. 25 is started with the destination set by the operator through the keyboard 8 shown in FIG. 22.

Steps S1B, S2B, and S3B of FIG. 25 correspond to the steps of S1, S2, and S3 of FIG. 6, respectively.

Figure 27A:
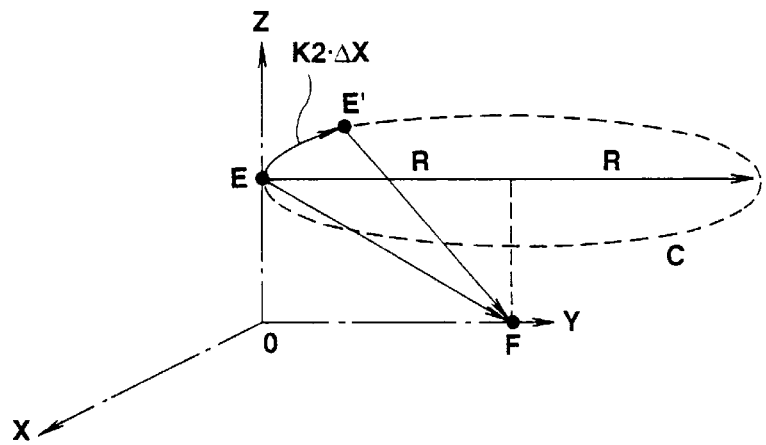
FIGS. 27A through 27E are explanatory views of the three-dimensional coordinate system for explaining movements of the viewing point and line of sight direction in a seventh preferred embodiment according to the present invention.

Referring to FIG. 27A, at a step S4B of FIG. 25, the CPU 4 specifies the viewing point E and direction of line of sight EF when the bird's eye view is to be displayed.

Before the joystick 100 is operated, suppose that the present position of the vehicle on the road map is set as a tip F of the direction of line of sight and a position of the upper sky in a direction opposite to the set destination with the present position of the vehicle as the reference and from which the direction of the present position of the vehicle is looked down over is set as the viewing point E from which the (optimally set) recommended route of travel can be viewed with the maximum length of the route of travel, as appreciated from FIG. 3B.

In the fifth embodiment, a vector indicating the direction of line of sight EF is called a line of sight direction vector and an underline is drawn to represent the vector quantity in a sense to distinguish it from a scalar quantity.

At a step S5B, the CPU 4 calculates the range of the road map displayed on the image screen of the display unit 5. That is to say, the CPU 4 determines where the part of the road map the trapezoid ABCD shown in FIG. 3B corresponds to.

At a step S6B, the CPU 4 reads the road map data in the range calculated at the step S5B from the road map memory 3.

At a step S7B, the CPU 4 transforms the road map data read at the step S6B into the bird's eye view display data. The CPU 4 transforms the road map data within the range of the trapezoid ABCD of FIG. 3A into the image data so as to reduce and display the image date within a rectangular abcd of FIG. 3B indicating the displayed region. Here, the recommended route of travel is the image data whose color is different from the normal road map data (top view road map) and the position in the bird's eye view corresponding to the present position of the vehicle is marked with the vehicle arrow mark synthesized with the bird's eye view data.

At a step S8B of FIG.25, the image data prepared at the step S7B is transferred into the V-RAM 7. Thus, the road map data within the trapezoid ABCD is transformed into the bird's eye view display data and is displayed on the image screen of the display unit 5.

At a step S9B, the CPU determines whether the vehicle has moved by the predetermined distance.

If Yes at the step S9B, the routine returns to the step S4B in which the CPU 4 selects the same viewing point E and direction of line of sight as those of the bird's eye which has been displayed at the time immediately before the vehicle stops.

If No at the step S9B, the routine goes to a step S10B in which the CPU 4 determines whether the joystick 100 has been operated. If No at the step S10B, the routine returns to the step S9B.

If No at the step S10B, the routine goes to a step S11B.

At the step S11B, the CPU 4 calculates the operating variables (ΔX, ΔY, ΔZ) of the joystick 100 on the basis of the calculation formulae (1) through (3).

Thereafter, the CPU 4 calculates the scroll quantity (Sx, Sy, Sz) on the basis of the following formulae (4) through (6). It is noted that coefficient k1 in the formulae (4) through (6) denotes a positive constant.

$$Sx = k1 \cdot \Delta X \quad (4),$$

$$Sy = k1 \cdot \Delta Y \quad (5),$$

$$Sz = k1 \cdot \Delta Z \quad (6),$$

In the formulae (4) through (6), the common coefficient k1 is multiplied by ΔX, ΔY, and ΔZ. Alternatively, a different coefficient for each direction may be multiplied as expressed as follows:

$$Sx = kx \cdot \Delta X \quad (7),$$

$$Sy = kx \cdot \Delta Y \quad (8),$$

$$Sz = kx \cdot \Delta Z \quad (9),$$

At a step S12B, the CPU deviates the viewing point E by the calculated scroll quantity at the step S11B.

Figure 26A:
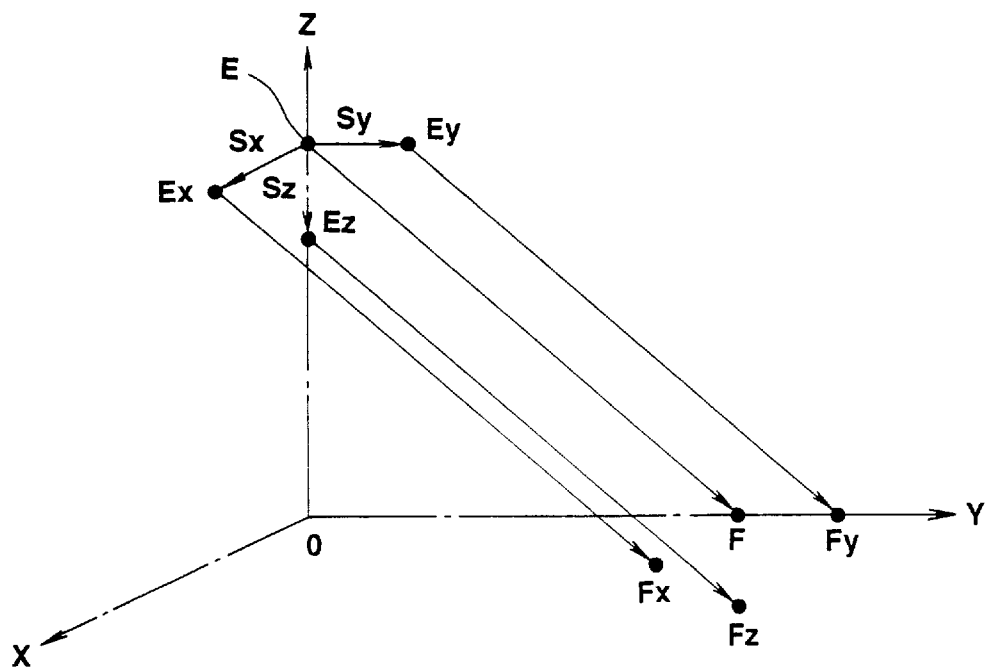
FIG. 26A is an explanatory view of a three-dimensional coordinate system for explaining a movement of a viewing point in the case of the fifth embodiment shown in FIG. 22.

For example, when the joystick 100 is operated by ΔX in the X-axis direction, a point Ex to which the viewing point E is moved by Sx in the X-axis direction is set as the viewing point position, as shown in FIG. 26A.

In addition, the direction of line of sight in this case is a vector of ExFx of FIG. 26A which is parallel to the old direction of line of sight EF. Similarly, when the joystick 100 is operated in the Y-axis direction by ΔY and in the Z-axis direction by ΔZ, respectively, the viewing point E is moved to Ey and Ez as shown in FIG. 26A.

When the process at the step S12B is ended, the routine returns to the step S5B in which the CPU 4 rewrites the bird's eye view display.

In the fifth embodiment, the position of the viewing point E is deviated according to the operation through the joystick 100 so that the viewing point E can arbitrarily be varied and the road map having an arbitrary range can be displayed on the image screen of the display unit 5.

In addition, since the direction of line of sight can be translated according to the operation of the joystick 100, the map area to be displayed on the display image screen of the display unit 5 can be common wherever the viewing point is set. Consequently, the distance relationship on the route of travel and destination can easily be grasped.

Furthermore, in the fifth embodiment, the viewing point E is moved in the direction toward which the joystick 100 is operated so that the bird's eye view is easily coincident with the operator's sense of feeling and the display along with the operator's intention can be carried out.

Sixth Embodiment

In a sixth embodiment, the position of the tip F of the line of sight vector EF is varied according to the movement of the joystick 100.

The structure and flowchart of the sixth embodiment are the same as those in the fifth embodiment except the step S12B of FIG. 25.

Figure 26B:
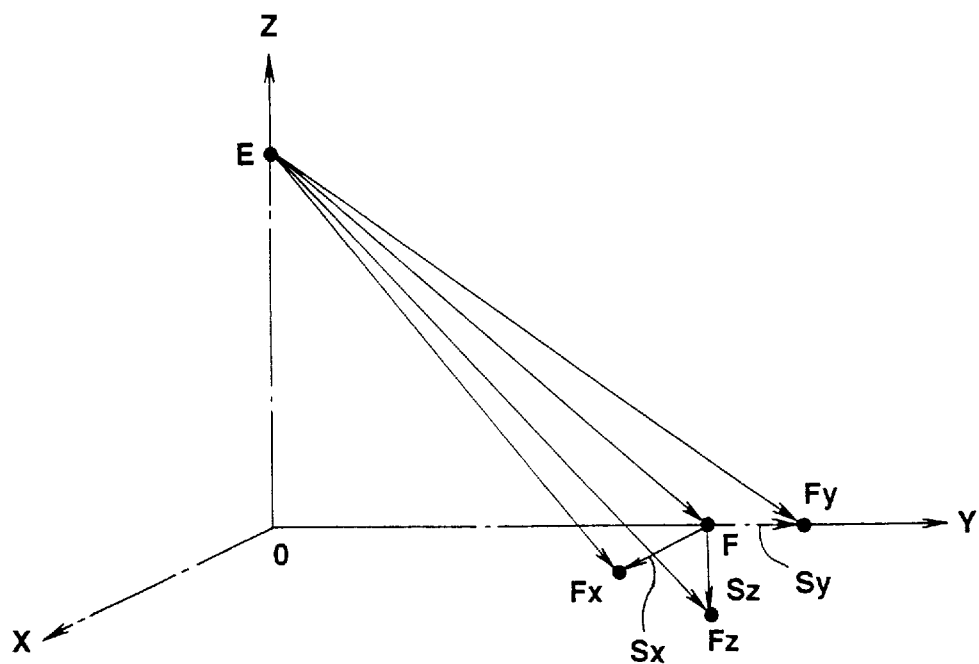
FIG. 26B is an explanatory view of a three-dimensional coordinate system for explaining a movement of a tip of a line of sight vector in a sixth preferred embodiment according to the present invention.

FIG. 26B shows the movement of the tip F of the line of sight vector EF in the case of the sixth embodiment.

When the movement of the joystick 100 indicates the scroll quantity Sx in the X-axis direction, a point Fx to which the tip F of the line of sight vector is moved in the X-axis direction by Sx is a new tip F of the line of sight vector as shown in FIG. 26B. Similarly, when the joystick 100 is moved by ΔY and ΔZ, respectively, in the Y direction and Z direction, the tip F of the line of sight vector is moved to Fy and Fz, respectively.

In the sixth embodiment, the line of sight is varied according to the operation of the joystick 100 with the viewing point position fixed. Thus, it is convenient for the operator (vehicular occupant) to recognize or check to see, for example, the road map surrounding to the present position of the vehicle through the display unit 5.

In addition, since the operation direction of the joystick 100 is coincident with the movement direction of the tip of the direction of line of sight, it is coincident with the operator's sense of feeling and display in accordance with the operator's intention can be carried out.

Seventh Embodiment

In a seventh preferred embodiment of the vehicular navigating apparatus, the viewing point is rotated in accordance with the operation of the joystick 100 and a mode switching means is provided. When the mode is switched by means of the mode switching means, the tip F of the line of sight vector is moved (translated) or rotated according to the operation of the joystick 100.

The difference from the fifth and sixth preferred embodiments is only the step S12B of FIG. 25.

FIGS. 27A, 27B, 27C, and 27D show the operation example of the joystick and coordinate system of the viewing point and line of sight vector for explaining the operation in the case of the seventh embodiment.

Suppose that, in FIGS. 27A through 27D, the X-axis component of the line of sight vector EF is zero and the Y-axis component of the line of sight vector EF is R.

In the seventh embodiment, the viewing point E is rotated along an outer periphery (dotted portion of FIG. 27A) of a circle C having a radius R which is parallel to the place XY, as shown in FIG. 27A.

Specifically, when the joystick 100 is operated by ΔX in the positive direction of X axis, the viewing point E is rotated along the circle C in a negative direction of X axis by k2·ΔX (k2>0). Then, suppose that a line segment connecting the viewing point E' after the rotation and a point F is a new line of sight vector E'Y.

Since, in the seventh embodiment, the viewing point E is rotated in the direction opposite to the direction toward which the joystick 100 is operated, the line of sight direction is always coincident with the direction of the operation of the joystick 100.

On the other hand, when the joystick 100 is operated in the Z-axis direction, the viewing point E is moved on a prolongation of the line of sight vector EF.

Figure 27B:
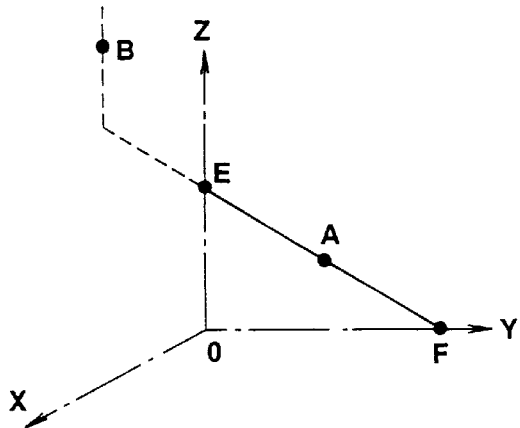

For example, when the joystick 100 is operated in a negative direction of the Z axis, i.e., when the joystick 100 is pushed toward the display panel 12, the viewing point E is moved to a position near the point F, for example, to a point A of FIG. 27B. Hence, as the pushing force on the joystick 100 becomes stronger, the road map becomes extended. On the contrary, when the joystick 100 is pulled in the positive direction of the Z axis, the viewing point E is moved away from the point F. Hence, as the pulling force on the joystick 100 becomes stronger, the road map becomes reduced.

In addition, when the joystick 100 is pulled to some degree in the positive direction of Z axis, the viewing point E is moved in the positive direction of the Z axis, i.e., to a point B shown in FIG. 27B. Consequently, the display unit 5 displays the road map which can be viewed from the upper sky straight above the road map, i.e, the normal top view of the road map.

Figure 27C:
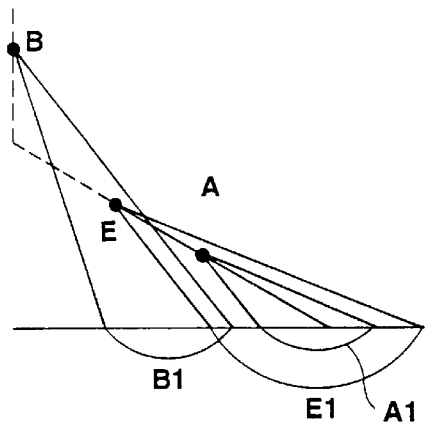

FIG. 27C shows a situation wherein the range of the road map displayed on the display image screen of the display unit 5 is varied according to the operation of the joystick 100 in the direction of the Z axis.

When the viewing point is placed at points A, E, and B shown in FIG. 27B, respectively, the respective ranges of the road map to be displayed are denoted by A1, B1, and E1 shown in FIG. 27C.

The reduction scale percentage of the bird'eye view is arbitrarily varied according to the operation of the joystick 100 in the direction of Z axis. In a case where the joystick 100 is pulled to some degree away from the display panel, the display is such that the road map is viewed from the direction of the upper sky near the straight above the road map, i.e., approximately the top view.

On the other hand, after the joystick 100 is operated in the direction of either −Y or +Y, it is operated in the direction of Z axis. At this time, the line of sight vector tip F is moved according to the operating variables of the joystick 100 in place of the movement of the viewing point E.

In details, the mode switching is instructed according to the operation of the joystick 100 in the direction of Y axis so that the scrolling method in the case where the joystick 100 is operated in the direction of X axis is varied.

Figure 27D:
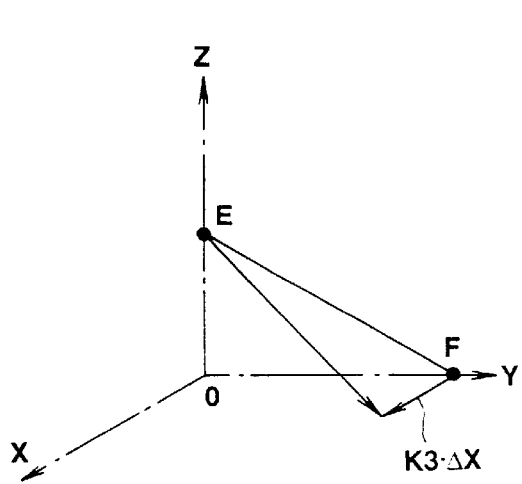

For example, when the joystick 100 is operated in the X axis direction by ΔX, the tip F of the line of sight vector is moved by k3·ΔX in the direction of X axis in parallel to the X axis as shown in FIG. 27D. Thus, with the position of the viewing point E fixed, only the position of the tip F of the line of sight vector can be varied.

Figure 27E:
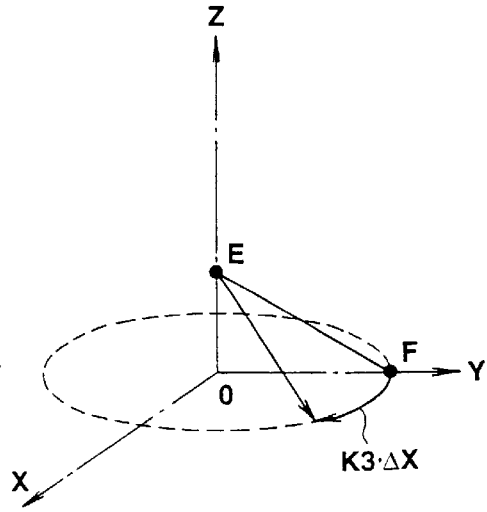

It is noted that, in place of the movement of the position of the tip F of the line of sight vector, the tip F of the line of sight vector may be rotated in accordance with the operation of the joystick 100 as shown in FIG. 27E.

As described above, since the operation of the joystick 100 permits rotation of the viewing point E, movement of the viewing point E on the line of sight vector, and movement of the tip F of the line of sight vector, in the seventh embodiment, a more flexible scrolling can be achieved.

In addition, since only the operation of the joystick 100 in the direction of X axis permits the rotation of the viewing point E, the viewing point E can be rotated even if an inexpensive joystick such as to enable the movement thereof in the direction of only X axis. Consequently, the cost-effective vehicular navigating apparatus can be achieved.

Furthermore, since the mode switching can be made according to the specific operation, for example, the operation in the Y-axis direction of the joystick 100, no switch is needed to switch the mode and, hence, the cost effective vehicular navigating apparatus can be achieved.

Eighth Embodiment

In an eight preferred embodiment, the scrolling of the displayed image road map is carried out according to a magnitude of a torsional force acted upon the joystick (hereinafter, referred to as a torsion quantity).

Figure 24C:
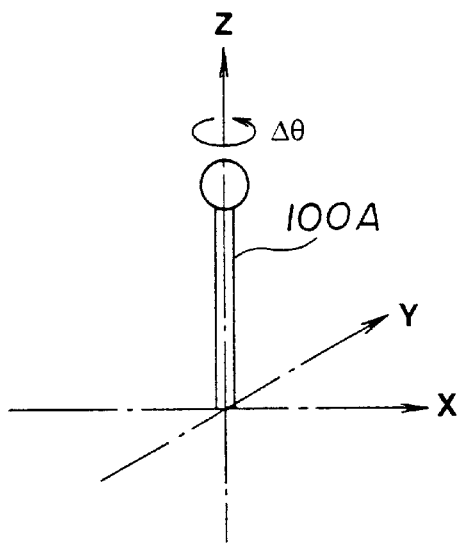

FIG. 24C shows a contour of the joystick 100A in the case of the eighth embodiment.

The joystick 100A has the same profile as that 100 of the fifth to seventh embodiments but can be twisted with the Z axis as the center. The CPU 4 can detect the torsion quantity when the joystick 100A is twisted. The torsion quantity can be detected by counting a number of pulses in a pulse train signal which is generated from a pulse generating member provided on a lower end of the joystick 101A whenever the joystick 100A is twisted by a predetermined quantity.

The difference in the eight embodiment from the fifth embodiment is the step S12B of FIG. 25.

In the eighth embodiment, the position of the viewing point E is moved in accordance with the operating variables of the joystick 100A in the same way as in the case of the fifth embodiment described above.

However, in the eighth embodiment, when the joystick 100A is twisted and the torsion quantity at this time is denoted by Δθ, the tip F of the line of sight vector is rotated by k4·Δθ (in radian).

As described above, the position of the viewing point E is moved according to the operation of the joystick 100A except the torsion (twisting) quantity exerted on the joystick 100A.

When the joystick 100A receives the torsion quantity (twisted), the tip F of the line of sight vector is rotated. Thus, since both of the viewing point E and the tip F of the line of sight vector can be moved, a more flexible scrolling can be achieved.

Although in the eighth embodiment the tip F of the line of sight vector is rotated according to the torsion quantity acted upon the joystick 100A, the viewing point E may be rotated according to the torsion quantity described above.

The same scrolling operation may be carried out in the same way as in either case of the sixth or seventh embodiments when the joystick is operated in the way except the torsion (twisting) of the joystick.

Figure 28:
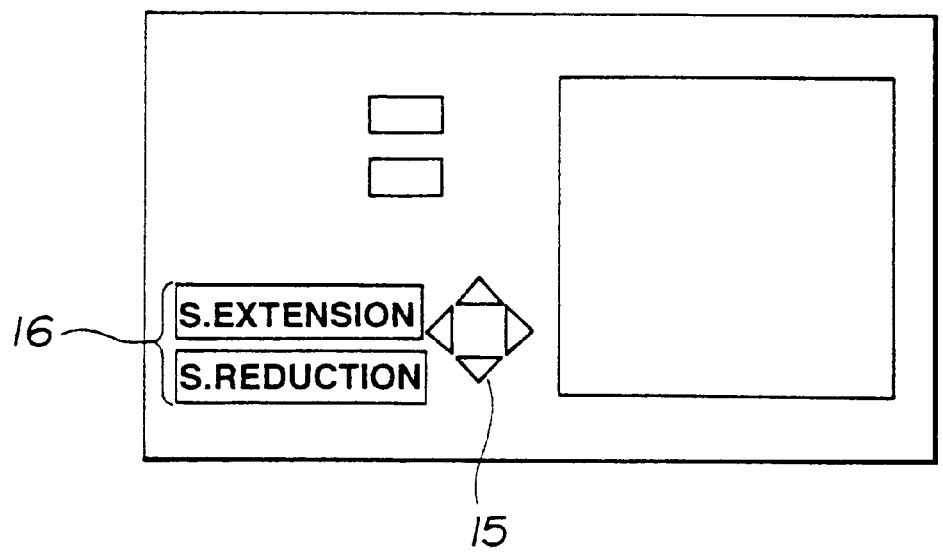
FIG. 28 is an explanatory view of a display panel with a joystick omitted for explaining an alternative of the fifth, sixth, seven, and eighth embodiments of the vehicular navigating apparatus.

Although, in the fifth to eighth embodiments, the joystick 100A (100) which can be operated through an arbitrary angle is used, such another type of joystick as being capable of being operated only in a predetermined direction for example, a numeral 8 type direction. Alternatively, as shown in FIG. 28, a switch group 15 comprising a plurality of switches to instruct the scrolling direction and a switch 16 to instruct a change in the scale of the reduction of the road map may be combined with the joystick in order to instruct the scrolling direction.

Although, in the fifth to eighth embodiments, the scroll quantity is determined not only according to the operation direction of the joystick but also according to the operating variables of the joystick, the detection of the operating variables on the joystick may not be carried out but only the operation direction of the joystick may be detected and instructed, with the scroll quantity always constant.

Furthermore, the operation of the mode switch and a special operation of the joystick may permit the selection of one of the scrolling operations described in the fifth embodiment through the eighth embodiment.

As described hereinabove, since the vehicular navigating apparatus and methods according to the present invention, the bird's eye view of the road map is displayed on the display image screen of the display unit such that the viewing point is set on the upper sky located in the direction opposite to the set destination with the present position of the vehicle as the reference and the road map surrounding the present position of the vehicle is viewed from the viewing point, the part of the road map surrounding the present position of the vehicle is extended and the set optimum route of travel is displayed up to a location near the set destination in the continuous reduction scale image pattern. Hence, it is not necessary to provide a switch to change the reduction scale percentage and display range of the road map is not limited.

The invention should be understood to include all possible embodiments and modification to the shown embodiments which can be embodied without departing from the principle of the invention as set forth in the appended claims.

What is claimed is:

1. An apparatus for navigating a vehicle displaying a map in a perspective view, comprising:

a road map memory for storing a road map in a plan view;

a position sensor for detecting a present position of the vehicle;

a display unit disposed on the vehicle to display the road map data on an image screen thereof;

a navigation controller including;

a destination setting part for setting a destination on the map to which the vehicle aims;

a route setting part for setting an optimum route of travel from the present position of the vehicle to the destination;

a display controller for controlling a road map image including the set route on the display unit, the display controller including;

a viewing point setting part for setting at least one viewing point for the perspective view of the road map, the viewing point being located on a point on an oblique upper sky higher than a height of the vehicle;

a viewing direction setting part for setting a viewing direction from the set viewing point to a display reference point on the road map data; and a transform calculator for transforming the plan view road map including the present position of the vehicle, the set optimum route of travel, and the destination into the perspective view looked down from the set viewing point along the set viewing direction on the set optimum route with at least the set viewing direction being varied so that a displayed distance of the set optimum route to be displayed in the perspective view on the display unit gives as maximum as possible.

2. An apparatus for navigating a vehicle displaying a map in a perspective view as claimed in claim 1, wherein the viewing point is also varied so that the displayed distance of the set optimum route to be displayed in the perspective view on the display unit gives as maximum as possible.

3. An apparatus for navigating a vehicle displaying a map in a perspective view as claimed in claim 2, wherein the viewing direction setting part sets a plurality of viewing points so as to vary the set viewing point and wherein the transform calculator transforms the plan view road map including the present position of the vehicle, the set optimum route of travel, and the destination into a plurality of the perspective views looked down from the set viewing point along the set viewing direction on the set optimum route, the number of the perspective views being according to the number of the viewing points, and which further comprises: a distance calculator for calculating the distance of the set optimum route of travel to be displayed in each of the perspective views; and a perspective view selector for selecting one of the perspective views including the longest distance of the set optimum route to be displayed on the display unit.

4. An apparatus for navigating a vehicle displaying a map in a perspective view as claimed in claim 1, wherein the viewing direction setting part sets a plurality of viewing directions so as to vary the set viewing direction and wherein the transform calculator transforms the plan view road map including the present position of the vehicle, the set optimum route of travel, and the destination into a plurality of the perspective views looked down from the set viewing point along the set viewing direction on the set optimum route, the number of the perspective views being according to the number of the viewing directions, and which further comprises: a distance calculator for calculating the distance of the set optimum route of travel to be displayed in each of the perspective views; and a perspective view selector for selecting one of the perspective views including the longest distance of the set optimum route to be displayed on the display unit.

5. An apparatus for navigating a vehicle displaying a map in a perspective view as claimed in claim 4, wherein the transform calculator frames a plurality of areas of the road map data according to the viewing point and the plurality of viewing directions, the area corresponding to the range to be displayed on the display unit, and the distance calculator calculates each distance of the set route in the plurality of the framed areas.

6. An apparatus for navigating a vehicle displaying a map in a perspective view as claimed in claim 5, wherein the framed areas are located in a predetermined angle with each other around the location on the road map data above which the viewing point is located.

7. An apparatus for navigating a vehicle displaying a map in a perspective view as claimed in claim 5, wherein the road map includes a plurality of links, each link representing one of the roads, respectively, and a distance data corresponding to each link, and the distance calculator retrieves links representing the set route within each frame in correspondence with each direction, and adds the distance of the links within the frame.

8. An apparatus for navigating a vehicle displaying a map in a perspective view as claimed in claim 1, wherein the viewing point setting part sets the viewing point on a higher point above a location which is on the opposite direction to the set destination with respect to the vehicle.

9. An apparatus for navigating a vehicle displaying a map in a perspective view as claimed in claim 1, which further comprises an operation device for generating a signal representing the operation by the driver of the vehicle, wherein the viewing point setting part corrects the viewing point position in response to the signal from the operation device, and wherein the direction setting part corrects the direction in response to the signal from the operation device.

10. An apparatus for navigating a vehicle displaying a map in a perspective view, comprising:

a road map memory for storing a road map in plan view;

a position sensor for detecting a present position of the vehicle;

a display unit disposed on the vehicle to display the road map data on an image screen thereof;

a navigation controller including;

a destination setting part for setting a destination on the map to which the vehicle aims;

a route setting part for setting an optimum route of travel from the present position of the vehicle to the destination;

a display controller for controlling a road map image including the set route on the display unit, the display controller including;

a viewing point setting part for setting at least one viewing point for the perspective view of the road map, the viewing point being located on a point on an oblique upper sky higher than a height of the vehicle;

a viewing direction setting part for setting a viewing direction from the set viewing point to a display reference point on the road map data; and a transform calculator for transforming the plan view road map including the present position of the vehicle, the set optimum route of travel, and the destination into the perspective view looked down from the set viewing point along the set viewing direction on the set optimum route with at least the set viewing point being varied so that a displayed distance of the set optimum route to be displayed in the perspective view on the display unit gives as maximum as possible.

11. A method for navigating a vehicle displaying a map in a perspective view, comprising the steps of:

storing a road map in a plan view;

detecting a present position of the vehicle;

setting a destination on the road map to which the vehicle is desired to finally reach;

setting an optimum route of travel from the present position of the vehicle to the destination;

setting at least one viewing point for the perspective view of the road map, the viewing point being located on a point on an oblique upper sky higher than a height of the vehicle;

setting a viewing direction from the set viewing point to a display reference point on the road map data;

varying either or both of the set viewing direction and the viewing point so that a displayed distance of the set optimum route to be displayed in the perspective view on a display unit gives as maximum as possible;

transforming the plan view road map including the present position of the vehicle, the set optimum route of travel, and the destination into the perspective view looked down from the set viewing point along the set viewing direction on the set optimum route; and displaying the transformed perspective view on an image screen of the display unit, the displayed distance of the set optimum route which is displayed in the perspective view giving maximum.

* * * * *